(12) United States Patent
Lin et al.

(10) Patent No.: US 7,864,519 B2
(45) Date of Patent: Jan. 4, 2011

(54) STORAGE SYSTEM ADAPTED FOR RECEIVING A PLURALITY OF HARD DISK DRIVES OF DIFFERENT DIMENSIONS

(75) Inventors: Kuo-Chih Lin, Yonghe (TW); Heng-Chih Yen, Sindian (TW); Yu-Jiun Wang, Taipei (TW); Shiuan-Jang Chen, Banciao (TW); Huan-Chin Wang, Linkou Township, Taipei County (TW)

(73) Assignee: Infortrend Technology, Inc., Taipei Hsien (TW)

( * ) Notice: Subject to any disclaimer, the term of this patent is extended or adjusted under 35 U.S.C. 154(b) by 305 days.

(21) Appl. No.: 12/068,251

(22) Filed: Feb. 5, 2008

(65) Prior Publication Data

US 2008/0191590 A1    Aug. 14, 2008

Related U.S. Application Data

(60) Provisional application No. 60/889,748, filed on Feb. 14, 2007.

(51) Int. Cl.
*G06F 1/16* (2006.01)
(52) U.S. Cl. .................................. 361/679.33
(58) Field of Classification Search ............. 361/679.33
See application file for complete search history.

(56) References Cited

U.S. PATENT DOCUMENTS

| | | | | |
|---|---|---|---|---|
| 5,414,591 | A * | 5/1995 | Kimura et al. ............... | 361/695 |
| 5,822,184 | A * | 10/1998 | Rabinovitz ............. | 361/679.31 |
| 6,202,291 | B1 * | 3/2001 | Toedtman ..................... | 29/739 |
| 6,351,375 | B1 * | 2/2002 | Hsieh et al. ............. | 361/679.33 |
| 6,667,880 | B2 * | 12/2003 | Liu et al. ................ | 361/679.35 |
| 6,856,508 | B2 * | 2/2005 | Rabinovitz ............. | 361/679.31 |
| 6,950,895 | B2 | 9/2005 | Bottom | |
| 6,957,291 | B2 * | 10/2005 | Moon et al. .................. | 710/302 |
| 7,092,245 | B2 * | 8/2006 | Shih ..................... | 361/679.33 |
| 7,106,577 | B2 * | 9/2006 | Shih ..................... | 361/679.33 |
| 7,177,145 | B2 * | 2/2007 | Carlson et al. ......... | 361/679.32 |
| 7,375,923 | B2 * | 5/2008 | DeCenzo et al. ......... | 360/97.02 |
| 7,394,660 | B2 * | 7/2008 | Hidaka ....................... | 361/727 |
| 7,414,835 | B2 * | 8/2008 | Katakura et al. ....... | 361/679.33 |
| 7,515,410 | B1 * | 4/2009 | Dingfelder et al. ..... | 361/679.33 |

(Continued)

FOREIGN PATENT DOCUMENTS

CN    2626010    7/2004

(Continued)

*Primary Examiner*—Lisa Lea-Edmonds
(74) *Attorney, Agent, or Firm*—Rosenberg, Klein & Lee

(57) ABSTRACT

A storage system adapted for receiving HDDs of different dimensions, including a casing, a backplane, at least one power supply module, and at least one storage controller is disclosed. The internal space of the casing forms at least one HDD receiving chamber. The HDD receiving chamber can be used for selectively receiving first type HDD devices or second type HDD devices. The two types of HDD devices are of different dimensions, for example, 2.5" and 3.5" HDDs. The backplane, the power supply module, and the storage controller are provided in the internal space of the casing. The backplane has a plurality of first connectors for electrically connecting to the HDD devices. The storage controller is electrically connected to the backplane and power supply module. A storage system capable of receiving mixed HDD devices of different dimensions is formed thereby.

33 Claims, 32 Drawing Sheets

U.S. PATENT DOCUMENTS

| | | | |
|---|---|---|---|
| 7,583,507 B2 * | 9/2009 | Starr et al. | 361/727 |
| 2005/0105265 A1 * | 5/2005 | Petrov et al. | 361/685 |
| 2005/0168934 A1 * | 8/2005 | Wendel et al. | 361/685 |
| 2005/0219810 A1 * | 10/2005 | Carlson et al. | 361/685 |
| 2005/0219826 A1 * | 10/2005 | Carlson et al. | 361/724 |
| 2006/0012950 A1 * | 1/2006 | Shih | 361/679 |
| 2007/0008695 A1 | 1/2007 | Chou | |
| 2007/0247802 A1 * | 10/2007 | Imsand | 361/685 |

FOREIGN PATENT DOCUMENTS

| | | |
|---|---|---|
| TW | 563033 | 11/2003 |
| TW | I235022 | 6/2005 |
| TW | M279949 | 11/2005 |

* cited by examiner

STORAGE SYSTEM ADAPTED FOR RECEIVING A PLURALITY OF HARD DISK DRIVES OF DIFFERENT DIMENSIONS

CROSS-REFERENCES TO RELATED APPLICATIONS

This application claims priority to U.S. Provisional Application No. 60/889,748, filed Feb. 14, 2007, entitled "Storage system having chambers each adapted for receiving a plurality of hard disk drives of different dimensions" which is incorporated herein by reference.

BACKGROUND OF THE INVENTION

1. Field of the invention

The present invention relates to a storage system and, more particularly, to a storage system adapted for receiving two types of hard disk drives of different dimensions.

2. Description of Related Art

A disk array workstation is a kind of data storage system with several hard disk drives (HDDs) installed therein. It provides large amount of information storage, retrieval and exchange capabilities. The internal space of the casing of a prior art disk array workstation can only receive HDDs of the same dimensions (e.g., 2.5" or 3.5" HDDs). For instance, U.S. Pat. Nos. 6,292,360 B1 and 6,459,571 B1 disclose this kind of storage system.

In practical use, however, it is necessary to utilize HDDs of different dimensions or different types due to such factors as price, performance and quality. Because most of the existent storage systems can only receive HDDs of the same dimensions (e.g., either 2.5" HDDs or 3.5" HDDs), the selection is less flexible. Users cannot obtain a storage system having mixed HDDs of different dimensions according to practical demands, resulting in much inconvenience.

Accordingly, the present invention aims to propose a storage system adapted for receiving HDDs of different dimensions to solve the above problem in the prior art.

SUMMARY OF THE INVENTION

A primary purpose of the present invention is to provide a storage system adapted for receiving HDDs of different dimensions. The storage system may have mixed HDDs of different dimensions received therein to meet practical demands and to facilitate the usage.

Another purpose of the present invention is to provide a storage system adapted for receiving HDDs of different dimensions. The storage system has a simple structure and can be easily assembled and is inexpensive.

To achieve the above purposes, the present invention provides a storage system adapted for receiving HDDs of different dimensions. The present invention comprises a casing, a backplane, at least one power supply module, and at least one storage controller. The casing has an internal space that forms at least one HDD receiving chamber. The HDD receiving chamber is used for selectively receiving a first type HDD device or a second type HDD device. The two types of HDD devices have HDDs of different dimensions received therein, respectively. The backplane is provided in the internal space of the casing and has a plurality of first connectors provided thereon for electrically connecting to the HDD devices. The power supply module is provided in the internal space of the casing. The storage controller is provided in the internal space of the casing and is electrically connected to the backplane and the power supply module.

To achieve the above purposes, according to another embodiment, the present invention also provides another storage system adapted for receiving HDDs of different dimensions. The storage system comprises a casing, a backplane, at least one power supply module, and at least one storage controller. The casing has an internal space that forms at least one HDD receiving chamber. The HDD receiving chamber is used for selectively receiving a plurality of first type HDD devices or a plurality of second type HDD devices. The two types of HDD devices have HDDs of different dimensions received therein, respectively. The backplane is provided in the internal space of the casing and has a plurality of first connectors for electrically connecting to the HDD devices. The power supply module is provided in the internal space of the casing. The storage controller is provided in the internal space of the casing and is electrically connected to the backplane and the power supply module. When the first type HDD device is received in the HDD receiving chamber, they are installed in a receiving box mounted in the HDD receiving chamber.

The present invention has the following advantages. The internal space of the casing forms at least one HDD receiving chamber, which is used for selectively receiving first type HDD device and/or second type HDD device, which are of different dimensions. Therefore, the selection of the dimensions of HDDs is more flexible. Users can obtain a storage system having mixed HDDs of different dimensions according to practical demands to facilitate the usage.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1:
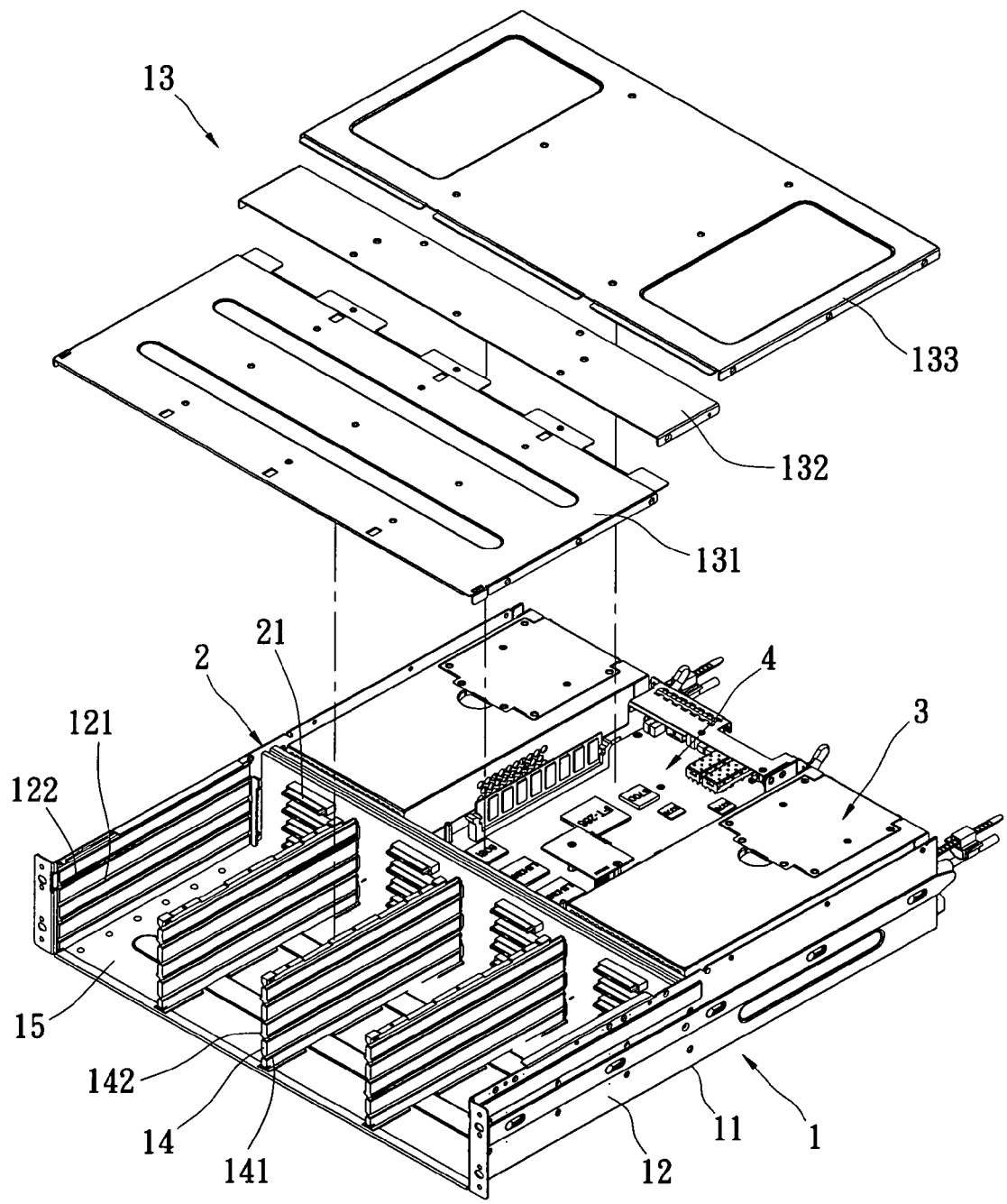
FIG. 1 is a perspective view of the storage system according to a first embodiment of the present invention.
Figure 2:
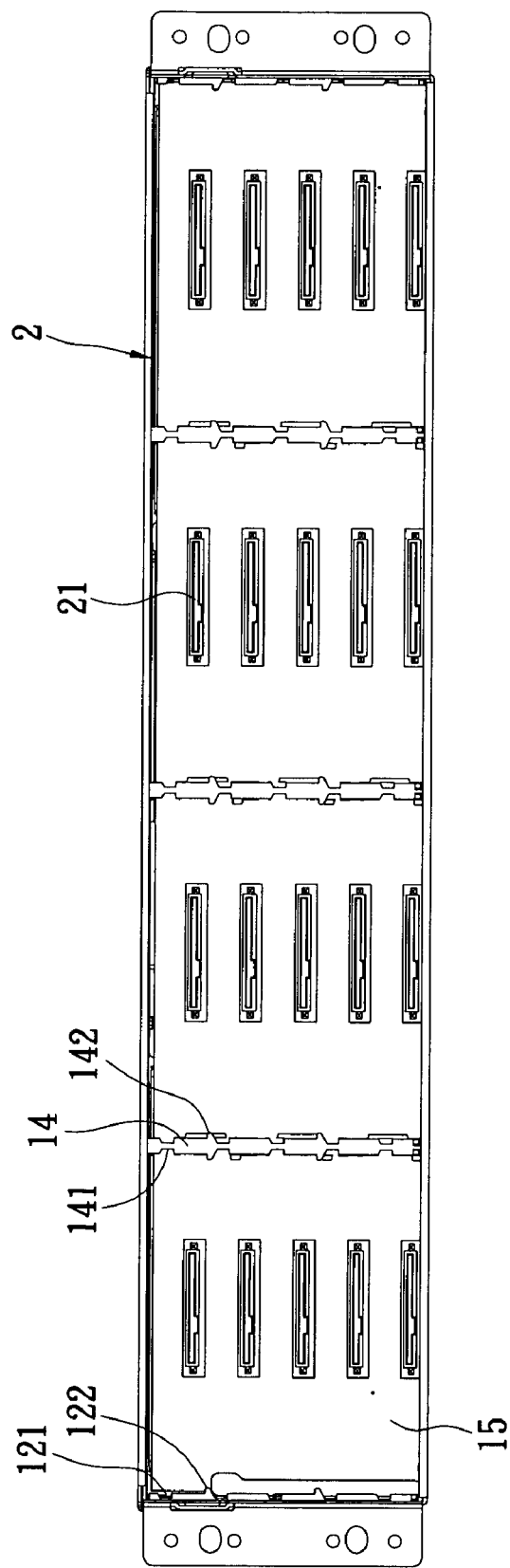
FIG. 2 is a front view of the storage system according to the first embodiment of the present invention.
Figure 3:
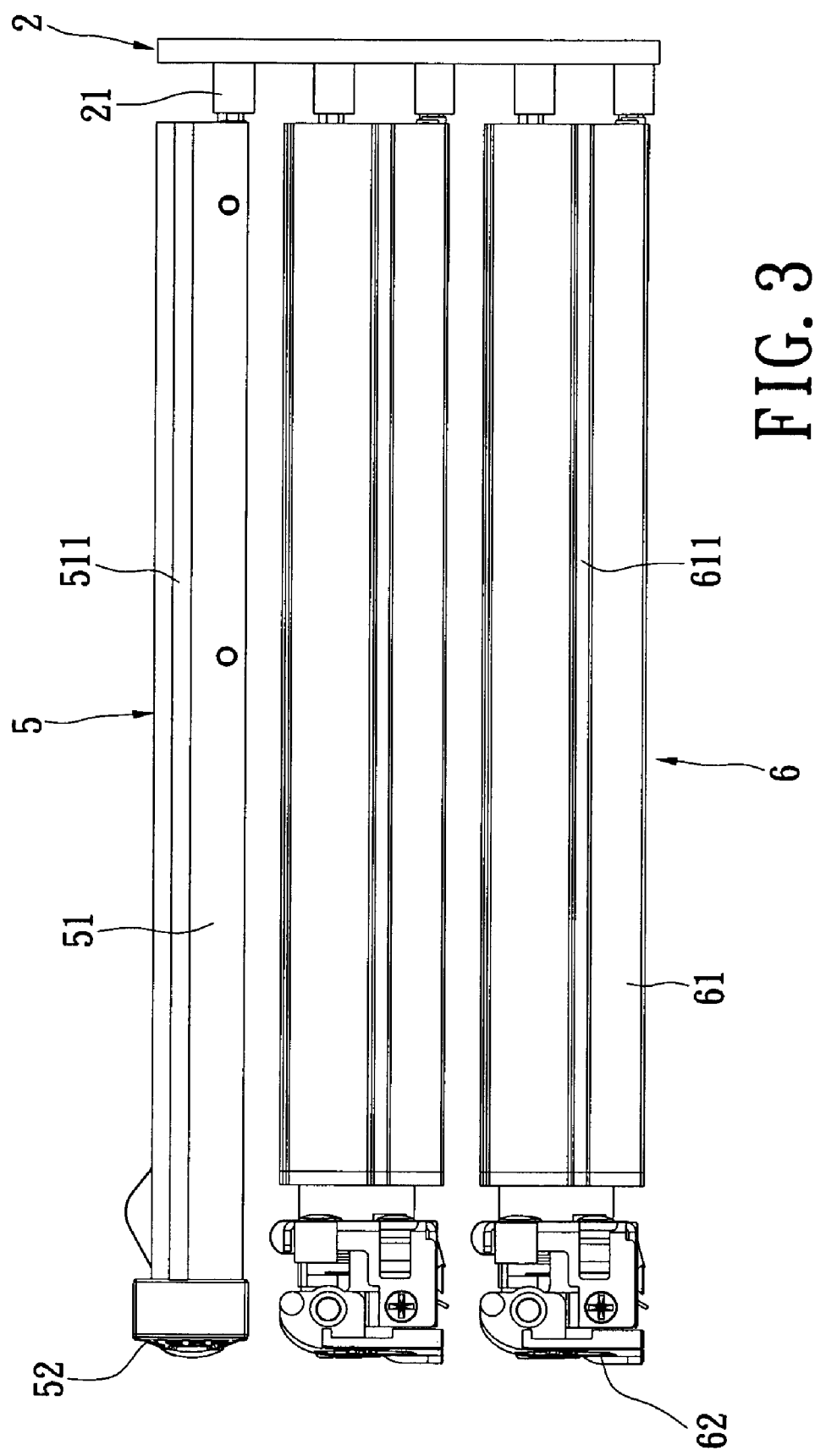
FIG. 3 is a side view of the first type of HDD device and the second type of HDD device and the backplane according to the first embodiment of the present invention.
Figure 4:
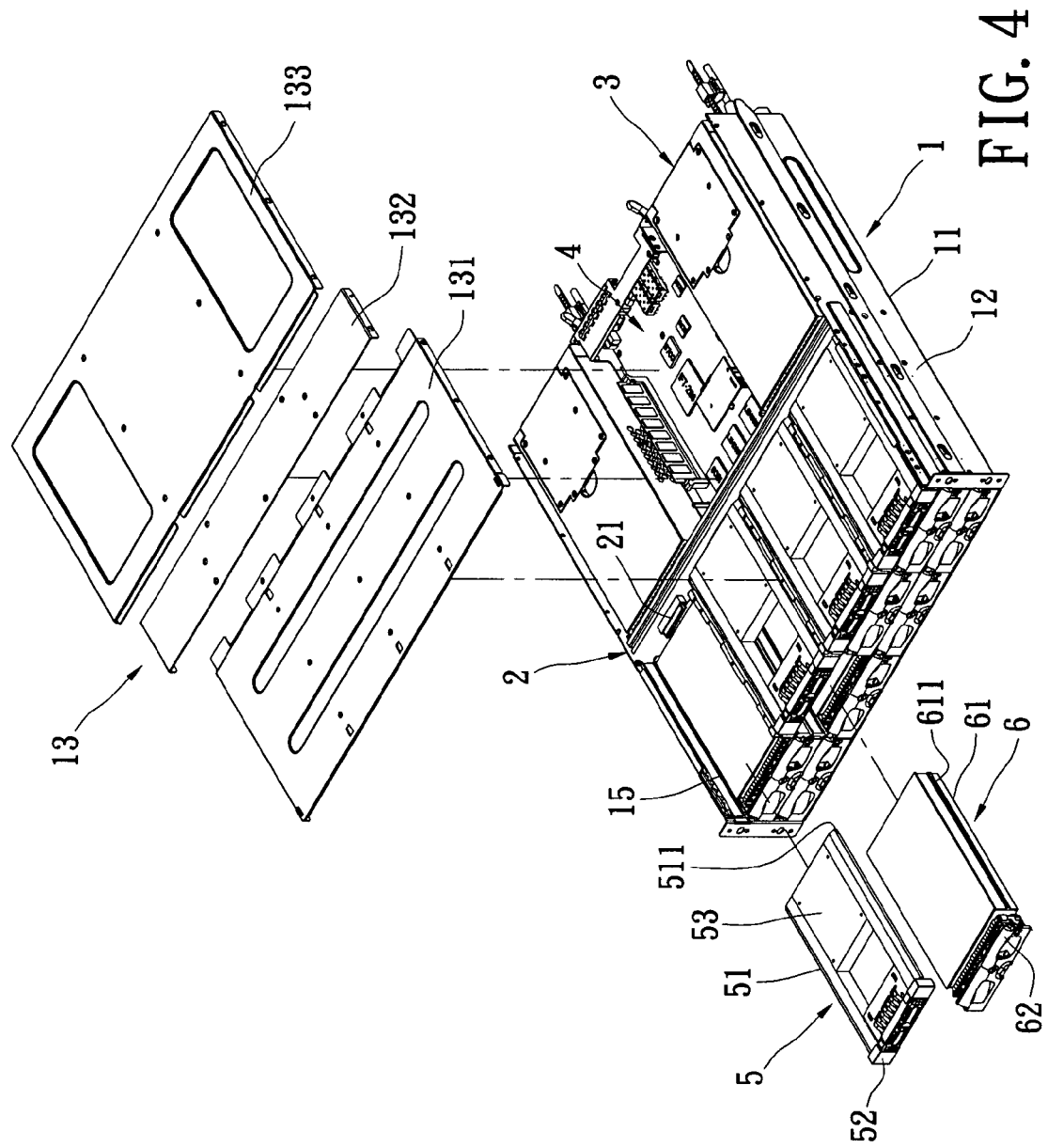
FIG. 4 is a perspective view of the storage system according to the first embodiment of the present invention with the first type HDD devices and the second type HDD devices received therein.
Figure 5:
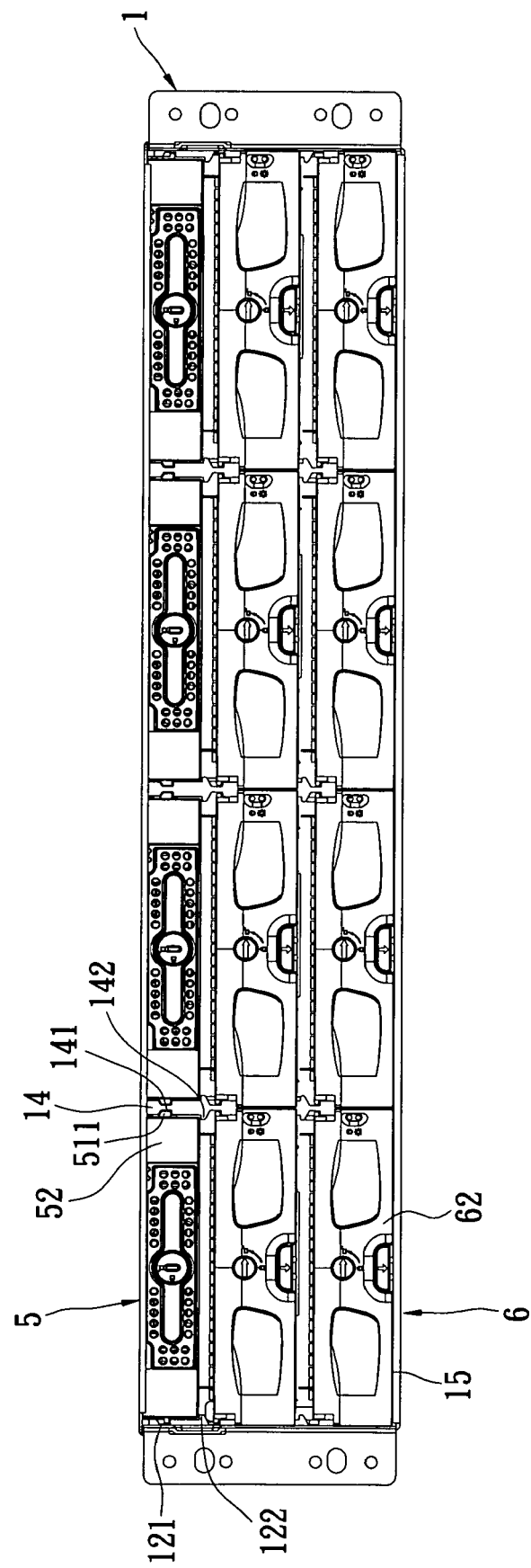
FIG. 5 is a front view of the storage system according to the first embodiment of the present invention with the first type HDD devices and the second type HDD devices received therein.

FIGS. 1 to 5 show the first embodiment of the present invention. FIG. 1 is a perspective view of the storage system according to a first embodiment of the present invention. FIG. 2 is a front view of the storage system according to the first embodiment of the present invention. FIG. 3 is a side view of the first type HDD device and the second type HDD devices and the backplane according to the first embodiment of the present invention. FIG. 4 is a perspective view of the storage system according to the first embodiment of the present invention with the first type HDD devices and the second type HDD devices received therein. FIG. 5 is a front view of the storage system according to the first embodiment of the present invention with the first type HDD devices and the second type HDD devices received therein. As shown in FIGS. 1 to 5, the storage system of the present invention comprises a casing 1, a backplane 2, one or more power supply modules 3, one or more storage controllers 4 and a plurality of first and second types of HDD devices 5 and 6. In this embodiment, the casing 1 is a 2 U casing (1 U is a height of 1.75"). The casing 1 is composed of a bottom panel 11 and two side panels 12 extending upwards from two opposite sides of the bottom panel 11 to form a hollow shell body with an open top and an open front end. An upper cover 13 is connected between the tops of the two side panels 12. The upper cover 13 is joined with the two side panels 12 by means of screwing or riveting to seal the top of the casing 1. In this embodiment the upper cover 13 includes a first upper cover 131, a second upper cover 132, and a third upper cover 133.

The backplane 2 is transversely arranged at the middle of the internal space of the casing to divide the internal space of the casing 1 into a front space and a rear space. A plurality of first connectors 21 are disposed on the front surface of the backplane 2. The first connectors 21 are electrical connectors complying with SAS (serial attached SCSI) specifications. The first connectors 21 are arranged in a plurality of rows. In this embodiment, there are four rows of the first connectors 21. Each row includes five equidistantly arranged first connectors 21, which can correspond to the first and second types of HDD devices.

A plurality of partitioning panels 14 are further disposed in the internal space of the casing 1 in front of the backplane 2 to sustain a carrier 51 of the first type HDD device 5. The partitioning panels 14 are made of heat conducting materials, such as aluminum, so as to have better heat conducting and heat radiating functions. The partitioning panels 14 are vertically disposed between the bottom panel 11, the two side panels 12, and the backplane 2, and divide the front space of the internal space of the casing 1 into a plurality of HDD receiving chambers 15 adapted for receiving the first type and second type HDD devices 5 and/or 6. The HDD receiving chambers 15 and the first type and second type HDD devices 5 and 6 are disposed in the internal space of the casing 1 in front of the backplane 2. In this embodiment, there are three partitioning panels 14 which divide the internal space of the casing 1 into four HDD receiving chambers 15, each of which respectively corresponds to one of the four rows of the first connectors 21. A plurality of slide grooves 141 and a plurality of slide tracks 142 are disposed and extend horizontally on two side surfaces of the partitioning panels 14, respectively. A plurality of slide grooves 121 and a plurality of slide tracks 122 are disposed and extend horizontally on inner side surfaces of the two side panels 12, respectively. The first type and second type HDD devices 5 and 6 can be guided into the HDD receiving chambers 15 by using the slide grooves 121 and 141 and the slide tracks 122 and 142.

The power supply module 3 and the storage controller 4 are provided in the internal space of the casing 1 behind the backplane 2. In this embodiment, there are two power supply modules 3 which are located at two sides of the storage controller 4 to provide power for the storage system. The storage controller 4 is electrically connected to the backplane 2 and the power supply modules 3 and is used to control data access. Moreover, appropriate heat radiating modules can also be provided in the casing and in the power supply modules 3 to assist in radiating heat. The above first upper cover 131, second upper cover 132, and third upper cover 133 cover the first type and second type HDD devices 5 and 6, the backplane 2, and the power supply modules 3 and the storage controller 4, respectively.

Figure 6:
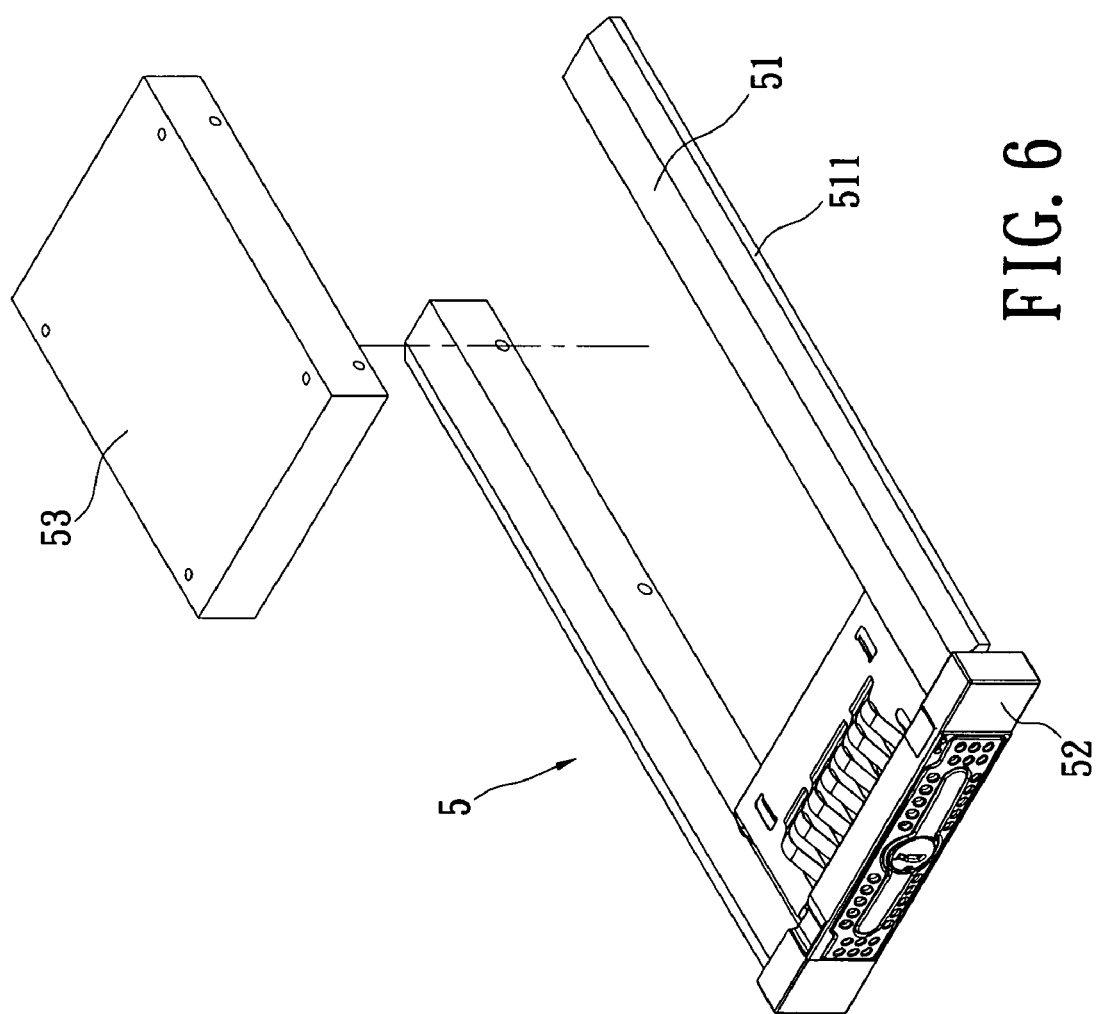
FIG. 6 is a perspective view of the first type HDD device according to the first embodiment of the present invention.

As shown in FIG. 6, the first type HDD device 5 includes a carrier 51, a faceplate 52, and an HDD 53. The carrier 51 is made of heat conducting materials, such as aluminum, so as to have better heat conducting and heat radiating functions. The carrier 51 is a frame. In this embodiment the HDD 53 is a 2.5" HDD and of about the shape with a width of 70.1 mm, a length of 100.2 mm and a height of 15 mm. The HDD 53 is fixed on the carrier 51. The HDD 53 can be a 2.5" SAS (Serial Attached SCSI) HDD. The faceplate 52 is connected with the front end of the carrier 51 to assist in extracting the first type HDD device 5. The first type HDD device 5 is horizontally placed in the HDD receiving chamber 15, and is slidably attached to the slide grooves 121 and 141 by the slide tracks 511 on the two sides of the carrier 51. Moreover, the first type HDD device 5 can slide on the slide tracks 122 and 142 by the bottom edges of the two sides of the carrier 51, so that the first type HDD device 5 can be guided to a predetermined position in the HDD receiving chamber 15.

Figure 7:
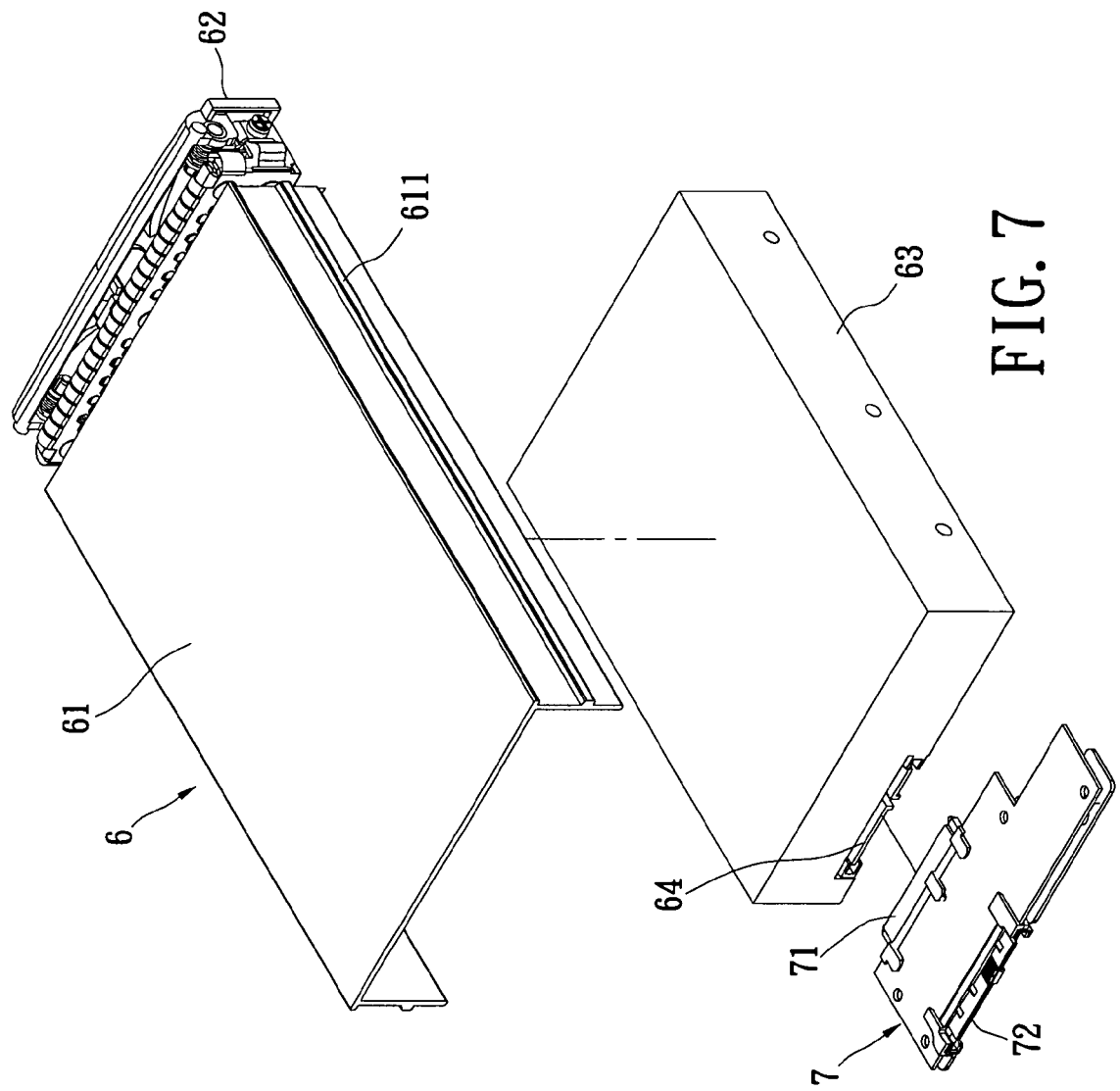
FIG. 7 is a perspective view of the second type HDD device according to the first embodiment of the present invention.
Figure 8:
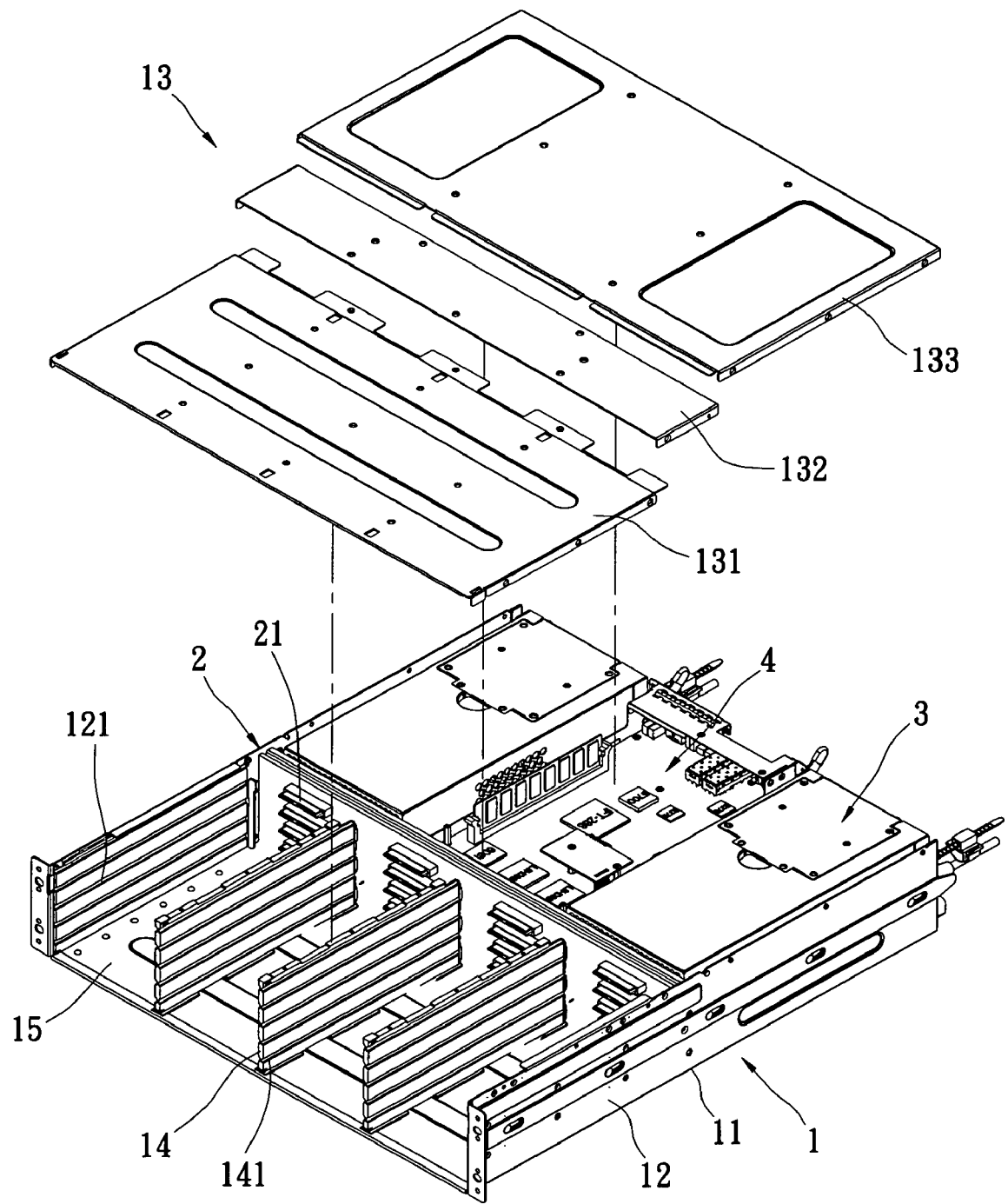
FIG. 8 is a perspective view of the storage system according to a second embodiment of the present invention.
Figure 9:
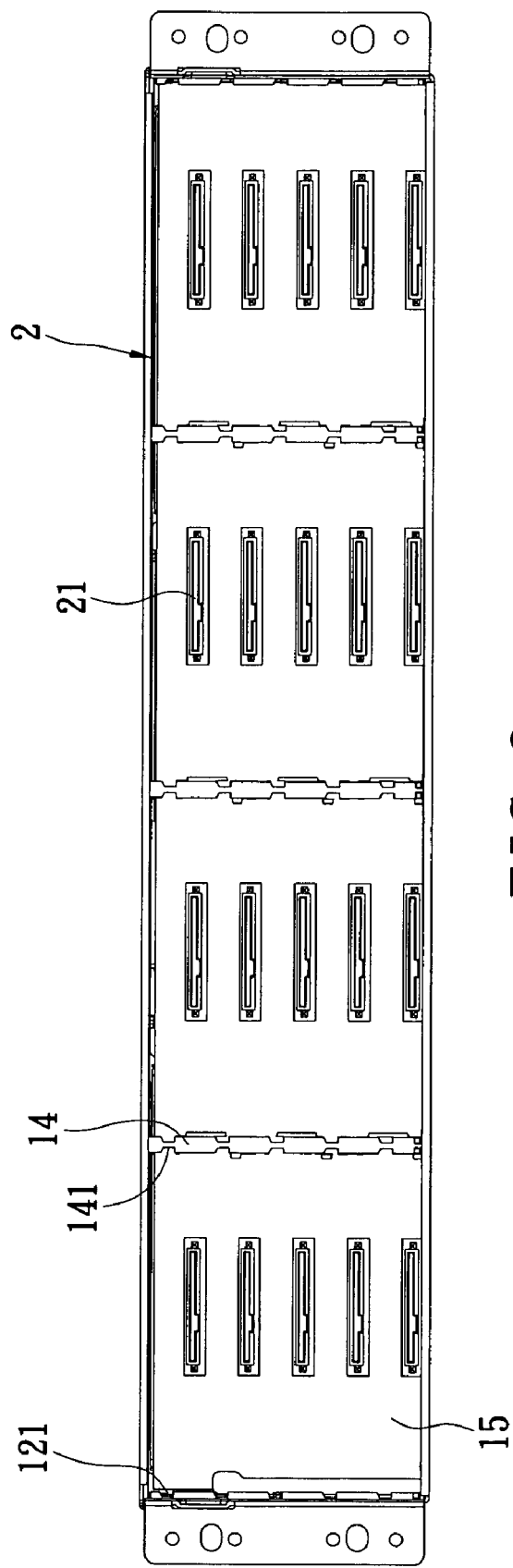
FIG. 9 is a front view of the storage system according to the second embodiment of the present invention.
Figure 10:
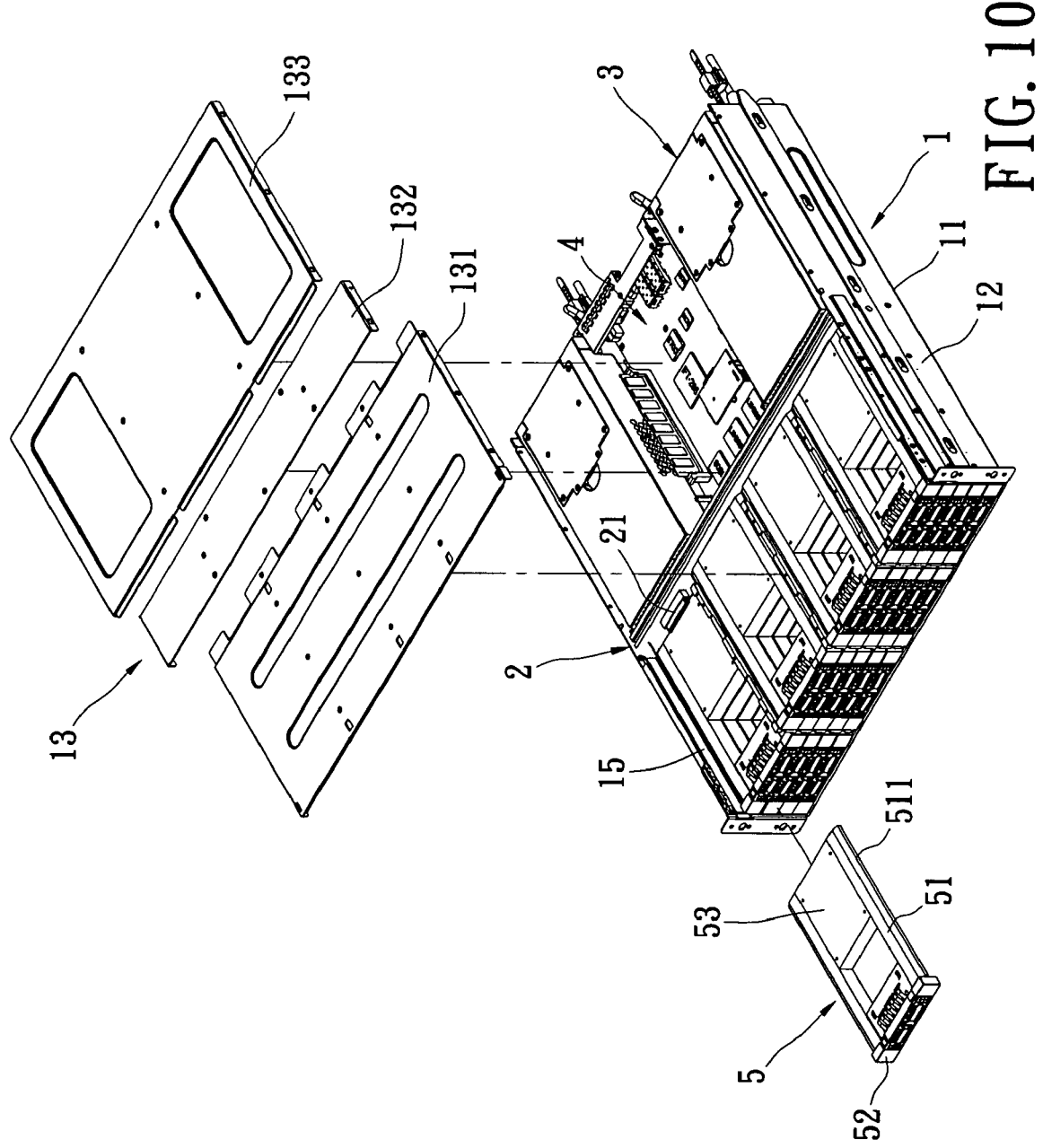
FIG. 10 is a perspective view of the storage system according to the second embodiment of the present invention with the first type HDD device received therein.
Figure 11:
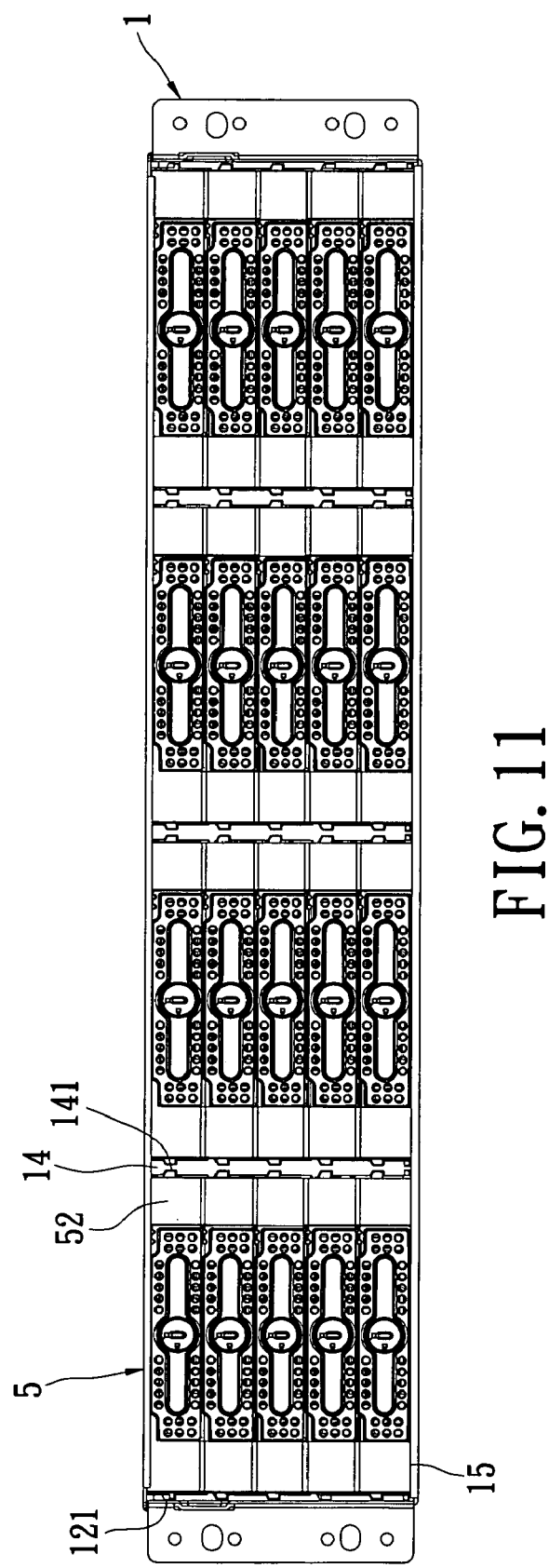
FIG. 11 is a front view of the storage system according to the second embodiment of the present invention with the first type HDD device received therein.

As shown in FIG. 7, the second type HDD device 6 includes a carrier 61, a faceplate 62, and an HDD 63. The carrier 61 is a hollow shell body with an open bottom and an open rear end, and is made of heat conducting materials, such as aluminum, so as to have better heat conducting and heat radiating functions. In this embodiment, the HDD 63 is a 3.5" HDD and of about the shape with a width of 101.6 mm, a length of 146.05 mm and a height of 25.4 mm. The HDD 63 is fixed inside the carrier 51. The HDD 63 can be a 3.5" SATA (Serial Advanced Technology Attachment) HDD or a 3.5" SAS HDD. The faceplate 62 is connected with the front end of the carrier 61 to assist in extracting the second type HDD device 6. The second type HDD device 6 is horizontally placed in the HDD receiving chamber 15 and is slidably attached to the slide grooves 121 and 141 by the slide tracks 611 on outer edges of the two sides of the carrier 61. Moreover, the second type HDD device 6 can slide on the slide tracks 122 and 142 by the bottom edges of the two sides of the carrier 61, so that the second type HDD device 6 can be guided to a predetermined position in the HDD receiving chamber 15.

The first type HDD device 5 can be electrically connected to the backplane 2 directly without adapter board 7 and thereby electrically connected to the storage controller 4 via the backplane 2.

Reference is also made to FIG. 7. The second type HDD device 6 has an adapter board 7. A second connector 71 is provided at the front end of the adapter board 7. The second connector 71 can be an electrical connector complying with the SATA specifications. A connector 64 complying with the SATA specifications is provided at the rear end of the HDD 63 to mate with the second connector 71, so that the HDD 63 can electrically connect with the adapter board 7.

A third connector 72 is provided at the rear end of the adapter board 7. The third connector 72 can be an electrical connector of an SAS specification. The third connectors 72 of the adapter boards 7 are mated with the first connectors 21 of the backplane 2 to electrically connect the second type HDD device 6 and the backplane 2. The second type HDD device 6 is also electrically connected to the storage controller 4 via the backplane 2.

In addition to electrically connecting the HDD 63 and the backplane 2, the adapter board 7 can also be used to space the HDD 63 apart from the backplane 2 in order to prevent the rear end of the HDD 63 from interfering with the corresponding first connector 21 not used on the backplane 2.

As shown in FIGS. 4 and 5, there are four HDD receiving chambers 15 provided in the internal space of the casing 1 in the first embodiment. The first type HDD device 5 and the second type HDD device 6, which are of different dimensions, can both be received in the HDD receiving chambers 15.

FIGS. 8 to 11 show the storage system according to a second embodiment of the present invention. As shown in FIGS. 8 to 11, in this embodiment, a plurality of slide grooves 141 extending horizontally is disposed on two side surfaces of the partitioning panels 14, respectively. A plurality of slide grooves 121 extending horizontally is disposed on inner side surfaces of the two side panels 12, respectively. The first type HDD devices can be guided in via the slide groves 121 and 141. There are four HDD receiving chambers 15 in the internal space of the casing 1. All the HDD devices received in the HDD receiving chambers 15 are the first type HDD devices 5 of the same dimension.

Figure 12:
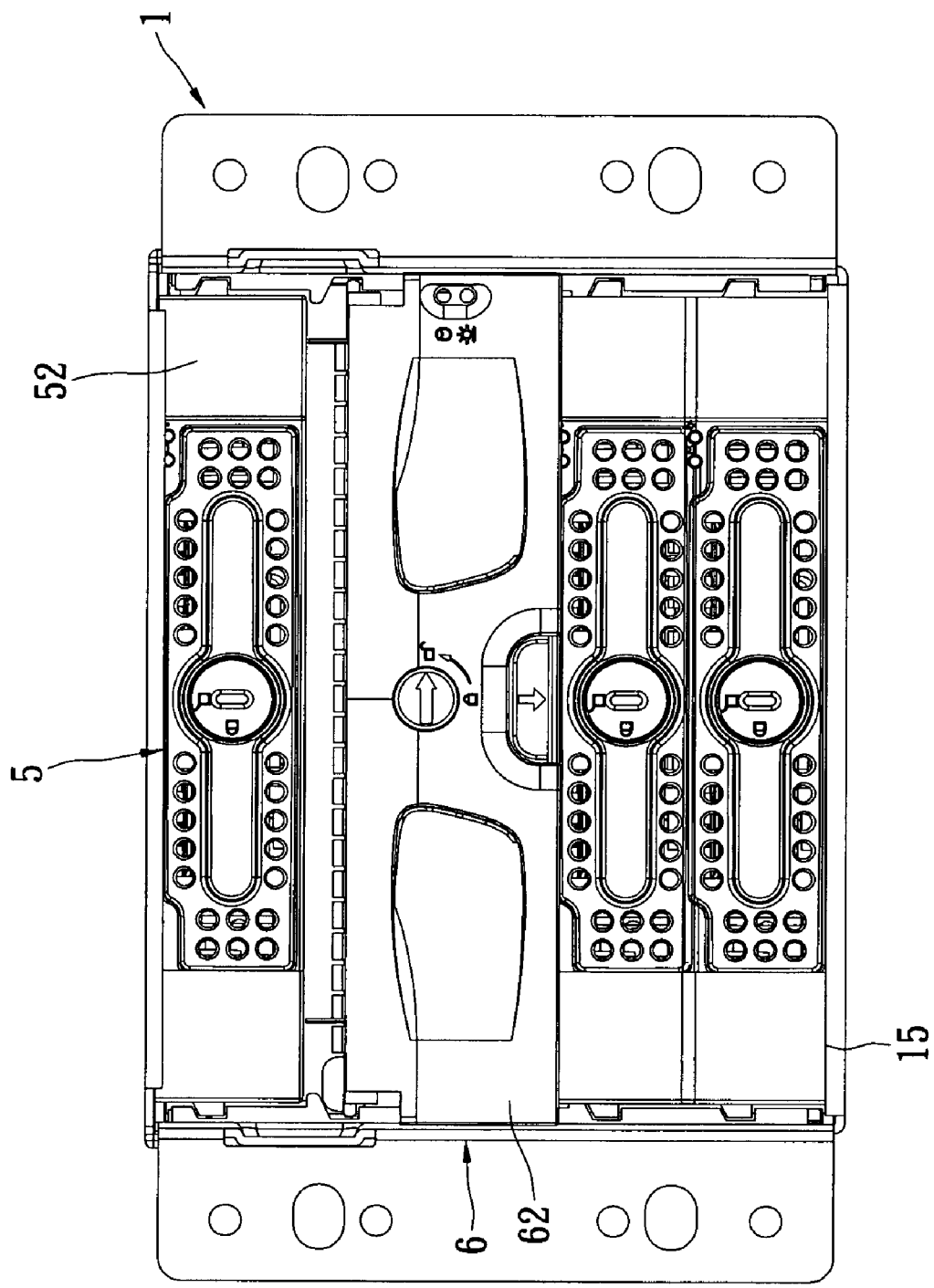
FIG. 12 is a front view of the storage system according to a third embodiment of the present invention with the first type HDD device and the second type HDD device received therein.
Figure 13:
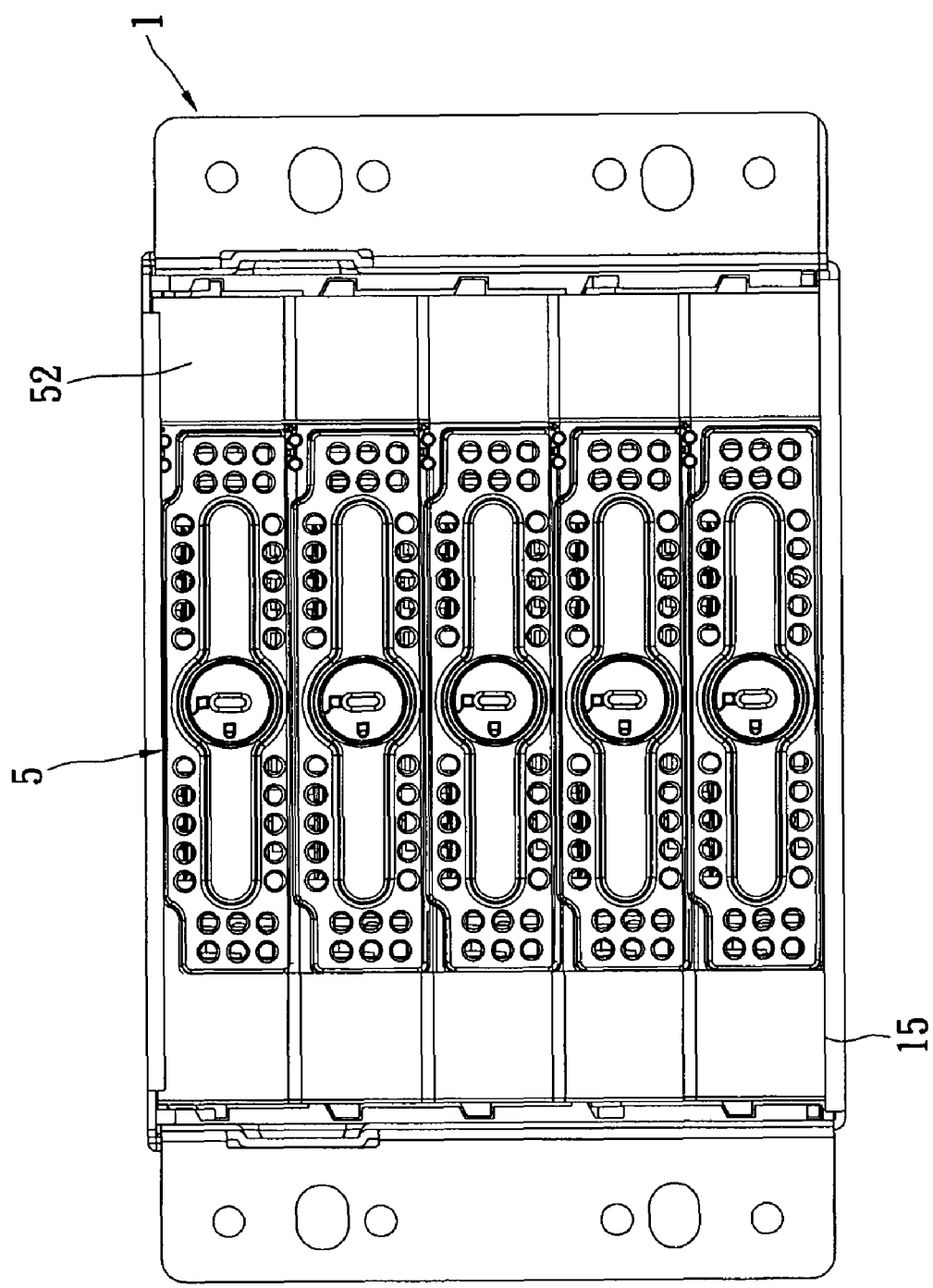
FIG. 13 is a front view of the storage system according to the third embodiment of the present invention with the first type HDD device received therein.

FIGS. 12 and 13 show the storage system according to a third embodiment of the present invention. As shown in FIGS. 12 and 13, in this embodiment, only a single HDD receiving chamber 15 is provided in the internal space of the casing 1. This HDD receiving chamber 15 can receive both the first type HDD device(s) 5 and the second type HDD device 6, which are of different dimensions (FIG. 12). Alternatively, all the HDD devices received in the HDD receiving chamber 15 can be the first type HDD device 5 of the same dimension (FIG. 13).

Figure 14:
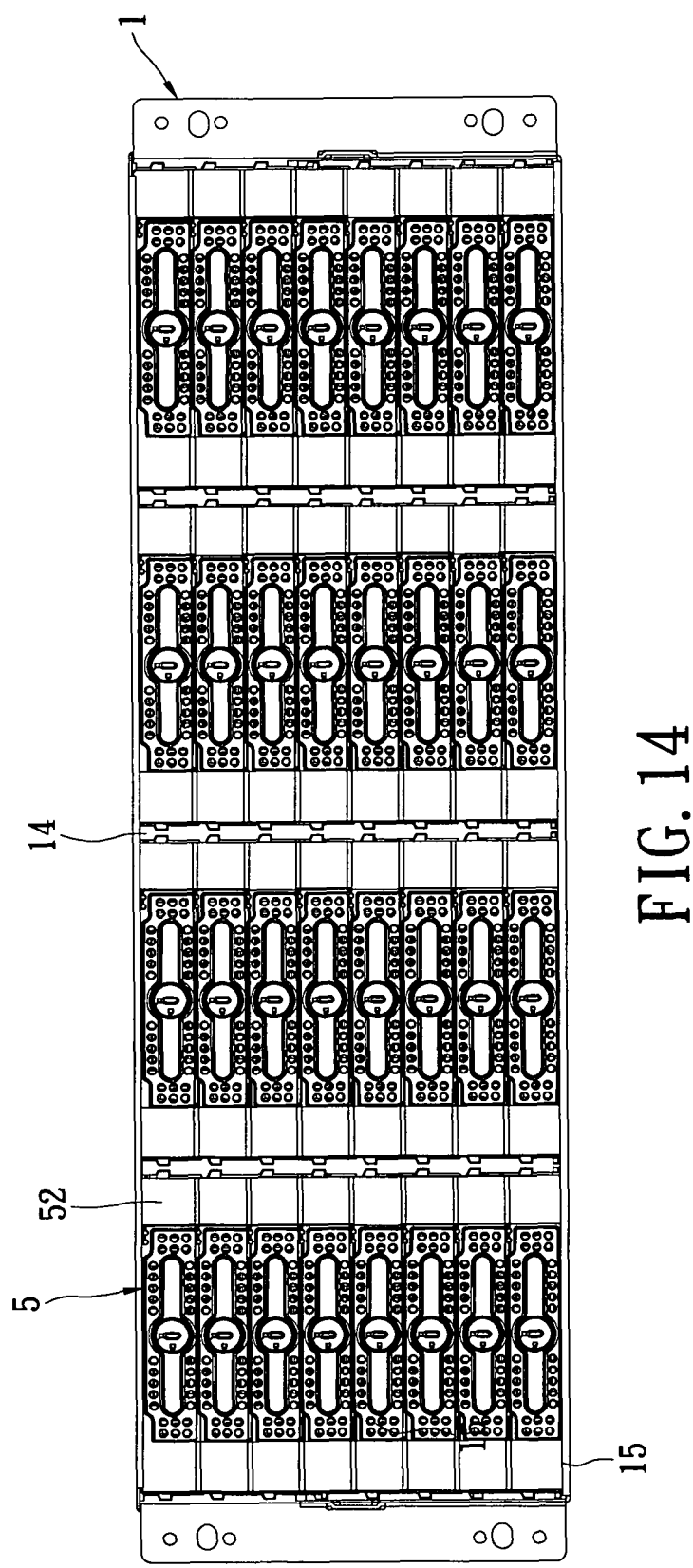
FIG. 14 is a front view of the storage system according to a fourth embodiment of the present invention with the first type HDD device received therein.
Figure 15:
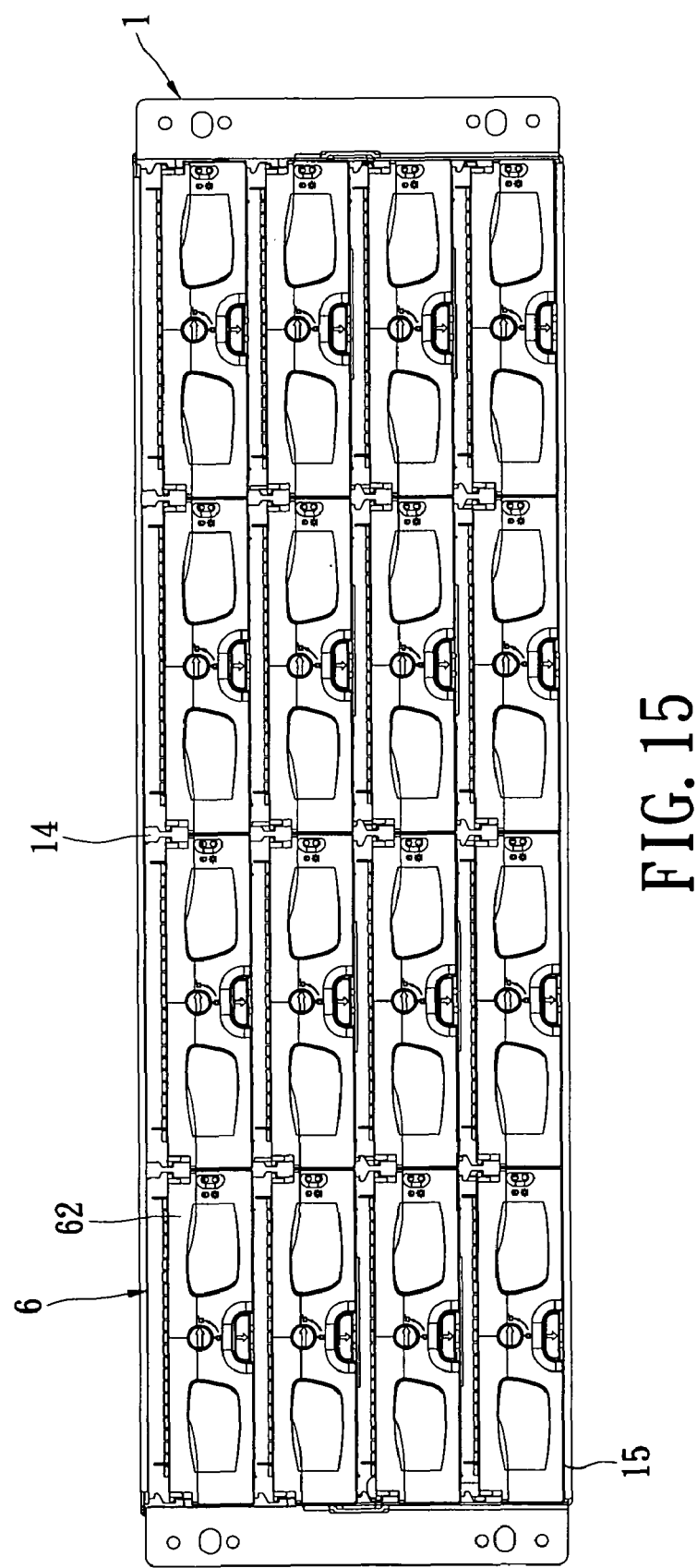
FIG. 15 is a front view of the storage system according to the fourth embodiment of the present invention with the second type HDD device received therein.

FIGS. 14 and 15 show the storage system according to a fourth embodiment of the present invention. As shown in FIGS. 14 and 15, in this embodiment, the casing 1 is of a height of 3 U. The HDD receiving chambers 15 can receive both the first type HDD device 5 and the second type HDD device 6, which are of different dimensions (not shown), or the HDD receiving chambers 15 can either receive only the first type HDD devices 5 of the same dimension (FIG. 14) or only the second type HDD devices 6 of the same dimension (FIG. 15). It should be noted that, in all the above embodiments of FIGS. 9 to 15, any two consecutive first type HDD devices 5 received in an HDD receiving chamber can be replaced with one second type HDD device 6. Therefore, five first type HDD devices 5, or three first type HDD devices 5 and one second type HDD device 6, or one first type HDD device 5 and two second type HDD devices 6, can be received in the HDD receiving chamber 15 in a 2 U casing (FIGS. 9 to 13). Moreover, in the HDD receiving chamber 15 of a 3 U casing (FIGS. 14 and 15), at most eight first type HDD devices 5, or at most four second type HDD devices 6, or a combination of the first type HDD device 5 and the second type HDD device 6, can be received therein.

In another embodiment, regardless of whether the casing is of 2 U height, 3 U height, or another height, if one part of the HDD receiving chamber 15 is exclusively used to receive the second type HDD device 6, and the other part of the HDD receiving chamber 15 can be used to receive the first type HDD device 5 and/or the second type HDD device 6, then part of the first connectors 21 can be removed to reduce the cost of the first connectors 21, depending on the situation. Please refer to FIG. 9, in which if the uppermost space in the leftmost HDD receiving chamber 15 is exclusively used to receive the second type HDD device 6, the first connectors 21 on the first position in the rows (counted from top to bottom) in the HDD receiving chamber 15 can be removed. If the lowermost space in the leftmost HDD receiving chamber 15 is exclusively used to receive the second type HDD device 6, the first connectors 21 on the fourth position (counted from top to bottom) in the HDD receiving chamber 15 can be removed.

Figure 18:
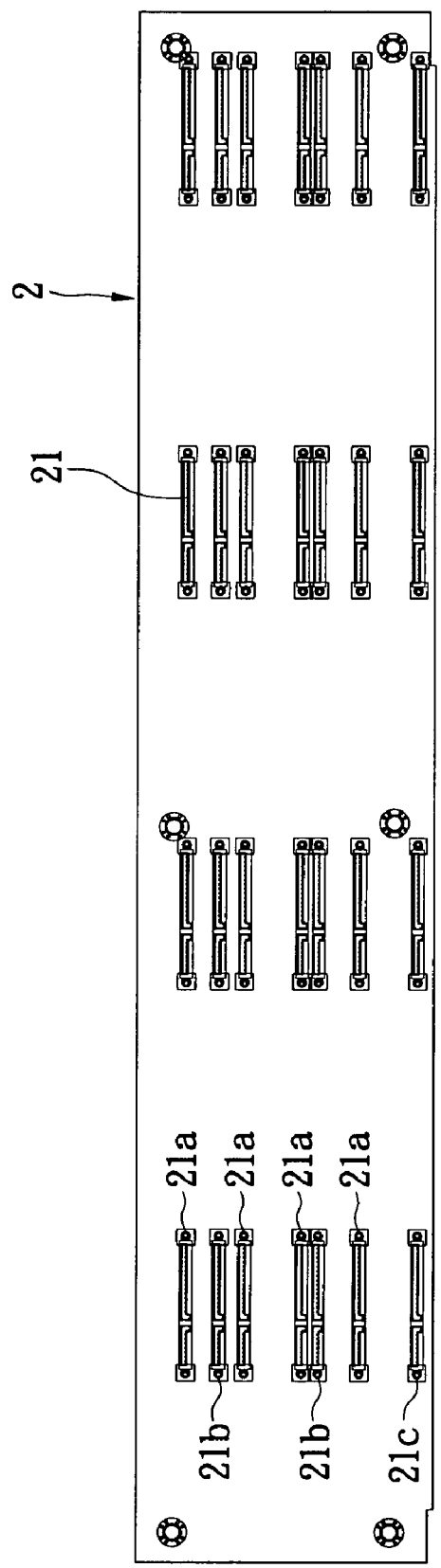
FIG. 18 is a front view of the backplane according to the fifth embodiment of the present invention.
Figure 21:
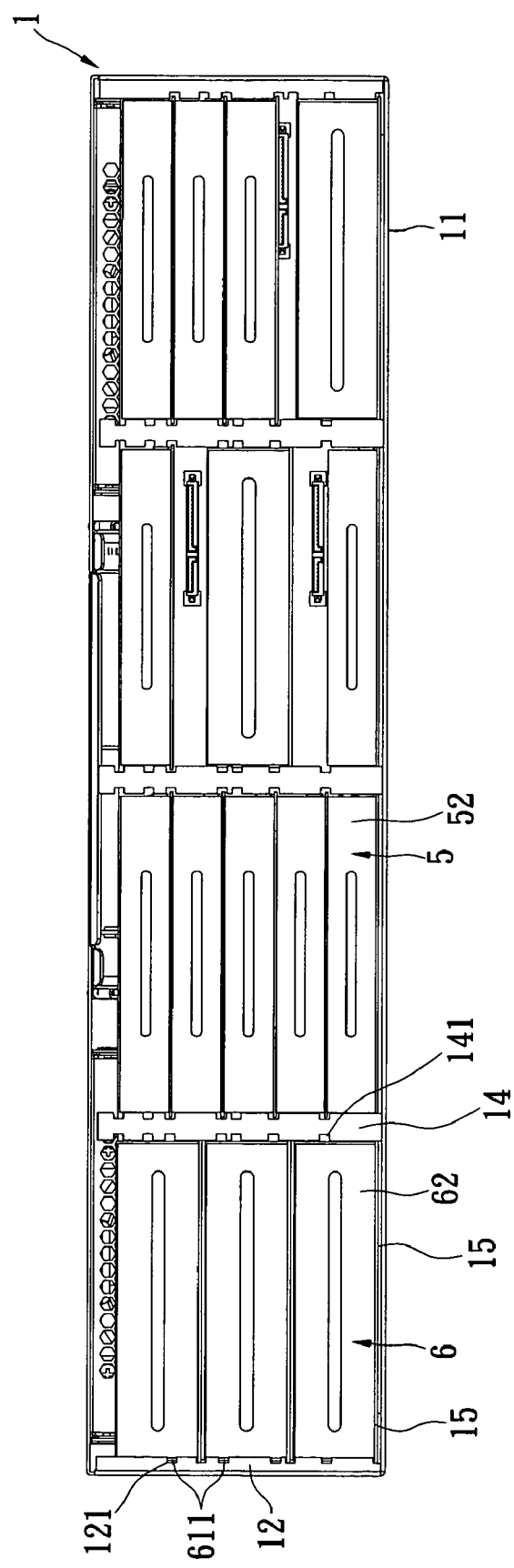
FIG. 21 is a front view of the storage system according to the fifth embodiment of the present invention.

In yet another embodiment, regardless of whether the casing is of 2 U height, 3 U height, or another height, if one part of the HDD receiving chamber 15 is exclusively used to receive the first type HDD device 5, and the other part of the HDD receiving chamber 15 can be used to receive the first type HDD device 5 and/or the second type HDD device 6, then part of the first connectors 21 can be removed to reduce the cost of the first connectors 21, depending on the situation. Reference is made to FIG. 18 and FIG. 21. If the uppermost space in the leftmost HDD receiving chamber 15 is exclusively used to receive two consecutive first type HDD devices 5, the first connectors 21 on the second position in the rows (counted from top to bottom) in the HDD receiving chamber 15 can be removed. If the lowermost space in the leftmost HDD receiving chamber 15 is exclusively used to receive the two consecutive first type HDD devices 5, the first connectors 21 on the fifth position (counted from top to bottom) in the HDD receiving chamber 15 can be removed.

In still yet another embodiment, regardless of whether the casing is of 2 U height, 3 U height, or another height, if one part of the HDD receiving chamber 15 is exclusively used to receive the first type HDD device 5, another part of the HDD receiving chamber 15 is exclusively used to receive the second type HDD device 6, and the other part of the HDD receiving chamber 15 can be used to receive the first type HDD device 5 and/or the second type HDD device 6, then part of the first connectors 21 can be removed to reduce the cost of the first connectors 21 depending on the situation. Reference is made to FIG. 14 and FIG. 15. If the lowermost two consecutive first type HDD device rooms in the leftmost HDD receiving chamber 15 are exclusively used to receive two first type HDD devices 5, and one adjacent second type HDD device room immediately above the two consecutive first type HDD device rooms is exclusively used to receive one second type HDD device 6, then part of the first connectors 21 (not shown) in the HDD receiving chamber 15 can be removed.

Figure 16:
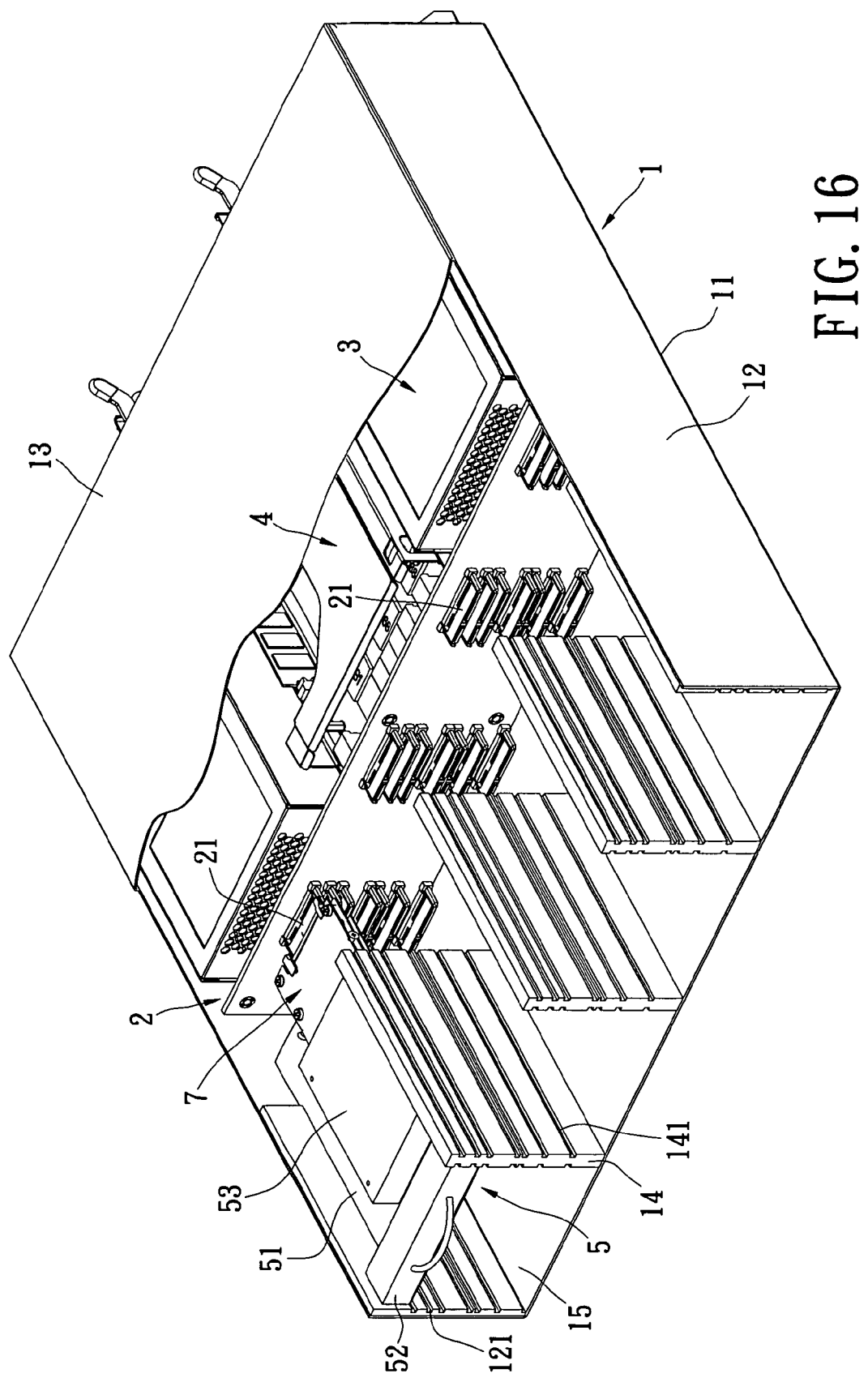
FIG. 16 is a perspective view of the storage system according to a fifth embodiment of the present invention with a single first type HDD device received therein.
Figure 17:
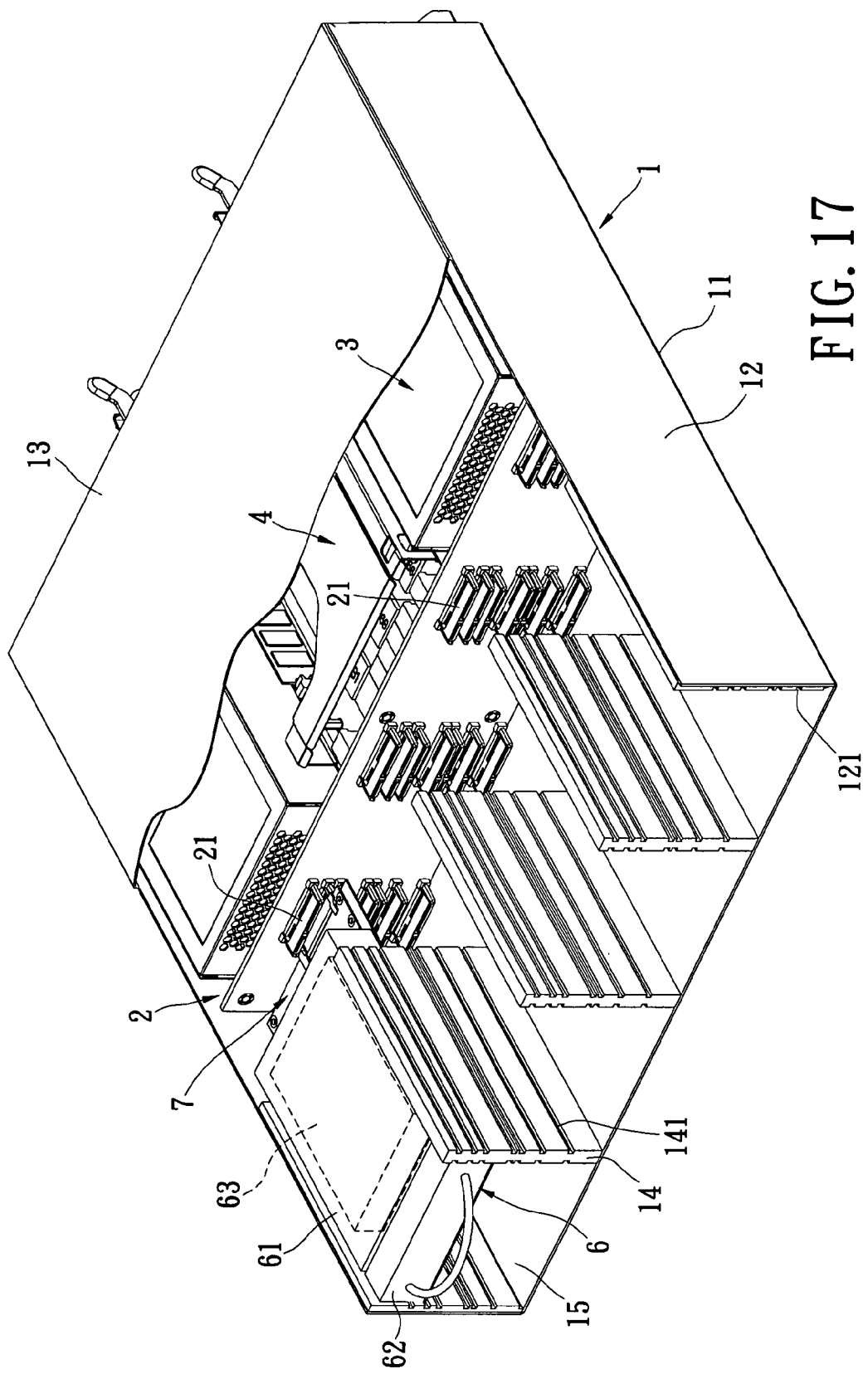
FIG. 17 is a perspective view of the storage system according to the fifth embodiment of the present invention with a single second type HDD device received therein.

FIGS. 16 and 17 show the storage system according to a fifth embodiment of the present invention. In this embodiment, the storage system comprises a casing 1, a backplane 2, one or more power supply modules 3, one or more storage controllers 4, and a plurality of first and second types of HDD devices 5 and 6. An upper cover 13 is connected between tops of two side panels 12 of the casing 1 to seal the top of the casing 1. In this embodiment, a plurality of first connectors 21 (also shown in FIG. 18) are provided on the front surface of the backplane 2. The first connectors 21 are electrical connectors complying with SAS specifications. The first connectors 21 are arranged in a plurality of rows. In this embodiment, there are four rows of first connectors 21, each row including seven first connectors that are non-equidistantly arranged to correspond to the first type and second type HDD devices 5 and 6. In this embodiment, each row includes four connectors 21a, two connectors 21b and one connector 21c, which are arranged in the order of the connector 21a, the connector 21b, the connector 21a, the connector 21a, the connector 21b, the connector 21a and the connector 21c from top to bottom. The connectors 21a correspond to the first type HDD device 5 of the dimension of 2.5". The connectors 21b correspond to the second type HDD device 6 of the dimension of 3.5". The connector 21c can correspond to either the first type HDD device 5 or the second type HDD device 6. The connector 21c can be used for both the first type HDD device 5 and the second type HDD device 6. That is, on the backplane, in each of the HDD receiving chambers, the first, third, fourth and sixth ones of the first connectors in the row are provided with connectors 21a for connecting to 2.5" HDD devices, the second and fifth ones of the first connectors in the row are provided with connectors 21b for connecting to 3.5" HDD devices, and the seventh one of the first connectors in the row is provided with the connector 21c for connecting to either a 2.5" or a 3.5" HDD device. The above connectors 21 are of the same orientation and aligned with each other from top to bottom so that the corresponding first type or second type HDD device 5 or 6 can be connected to the connectors 21 in the same orientation. Therefore, it is not necessary to rotate each HDD device 180 degrees to connect to the connector 21. In another embodiment, however, part of the HDD devices of the present invention can be rotated 180 degrees according to practical demands.

Although SAS HDDs have two different dimensions, 2.5" and 3.5", and SATA HDDs have one dimension, 3.5", all three kinds of HDDs can be connected to the same kind of SAS electrical connectors. Therefore, the connector at the end of the adapter board 7 that connects to the HDD, the front end, can be an SAS electrical connector or an SATA electrical connector to connect to an SATA HDD. It can also be an SAS electrical connector to connect to a 2.5" or 3.5" SAS HDD or to a 3.5" SATA HDD. In other words, the first connectors 21a, 21b and 21c can be SAS connectors to connect the SAS HDDs and SATA HDDs.

In this embodiment, there are three partitioning panels 14 that divide the internal space of the casing 1 into four HDD receiving chambers 15, which respectively correspond to the four rows of the first connectors 21. A plurality of slide grooves 141 extending horizontally is disposed on two side surfaces of the partitioning panels 14, respectively, and a plurality of slide grooves 121 extending horizontally is disposed on inner side surfaces of the two side panels 12, respectively. The first type and second type HDD devices 5 and 6 can be guided in via the slide groves 121 and 141.

Figure 19:
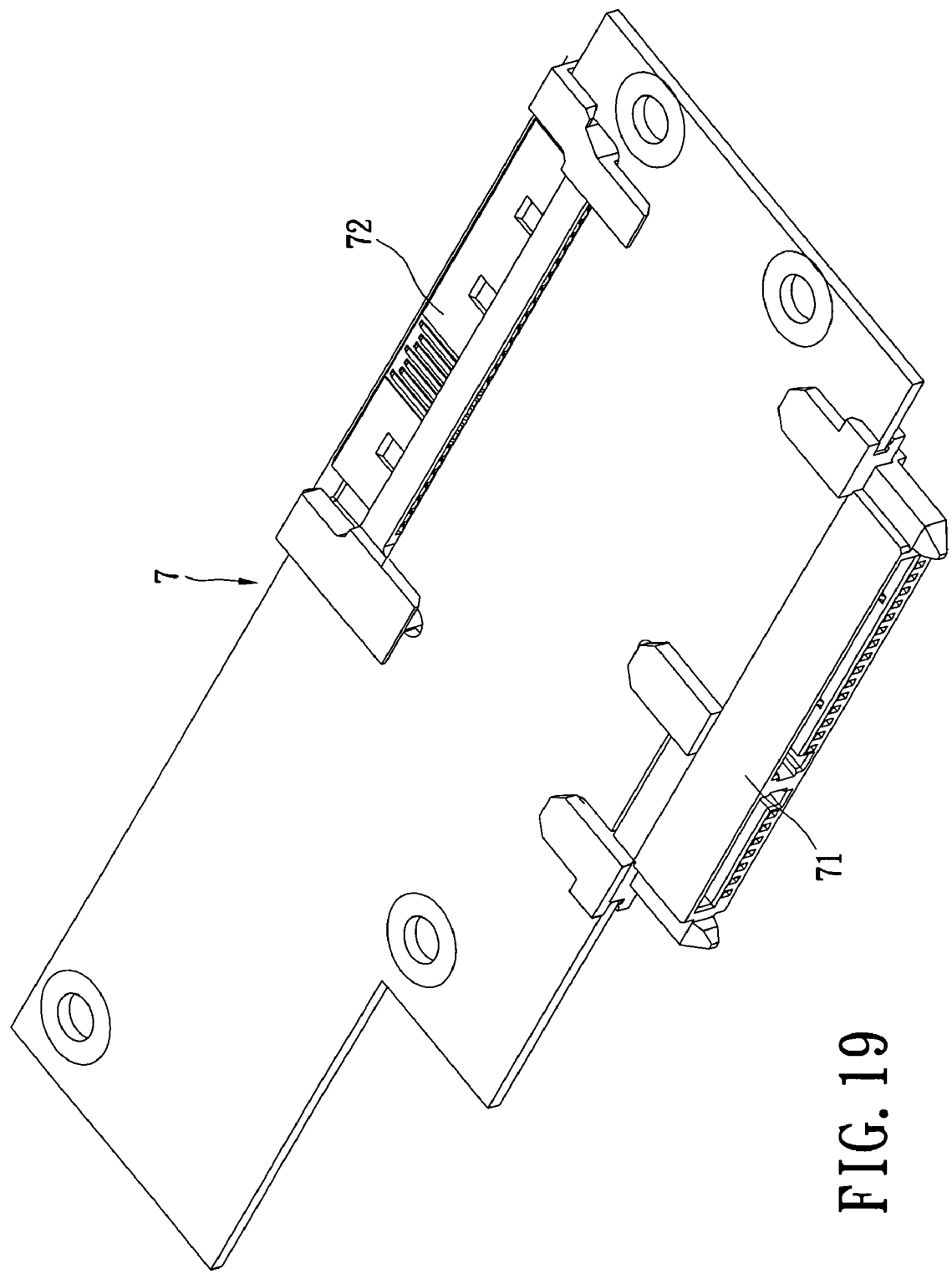
FIG. 19 is a perspective view of the adapter board according to the fifth embodiment of the present invention.

Both the first type and second type HDD device 5 and 6 have an adapter board 7 (also shown in FIG. 19). A second connector 71 is provided at the front end of the adapter board 7. The second connector 71 can be an electrical connector complying with SATA specifications. A connector (not shown) complying with SATA specifications is provided at the rear end of the HDD 63 to mate with the second connector 71 so that the HDD 63 can electrically connect with the adapter board 7. Alternatively, the second connector 71 can be an electrical connector complying with SAS specifications. A connector (not shown) complying with SAS specifications is provided at the rear end of the HDD 53 to mate with the second connector 71 so that the HDD 53 can electrically connect with the adapter board 7.

A third connector 72 is provided at the rear end of the adapter board 7. The third connector 72 is an electrical connector complying with SAS specifications. The third connectors 72 at the rear end of the adapter boards 7 are mated with the first connectors 21 of the backplane 2 so that the first type and second type HDD devices 5 and 6 can electrically connect with the backplane 2. The first type and second type HDD devices 5 and 6 are electrically connected to the storage controller 4 via the backplane 2.

In addition to electrically connecting the HDD 53 or 63 and the backplane 2, the adapter board 7 can also be used to space the HDD 53 or 63 apart from the backplane 2 in order to prevent the rear end of the HDD 53 or 63 from interfering with the corresponding first connector 21 not used on the backplane 2.

Figure 20:
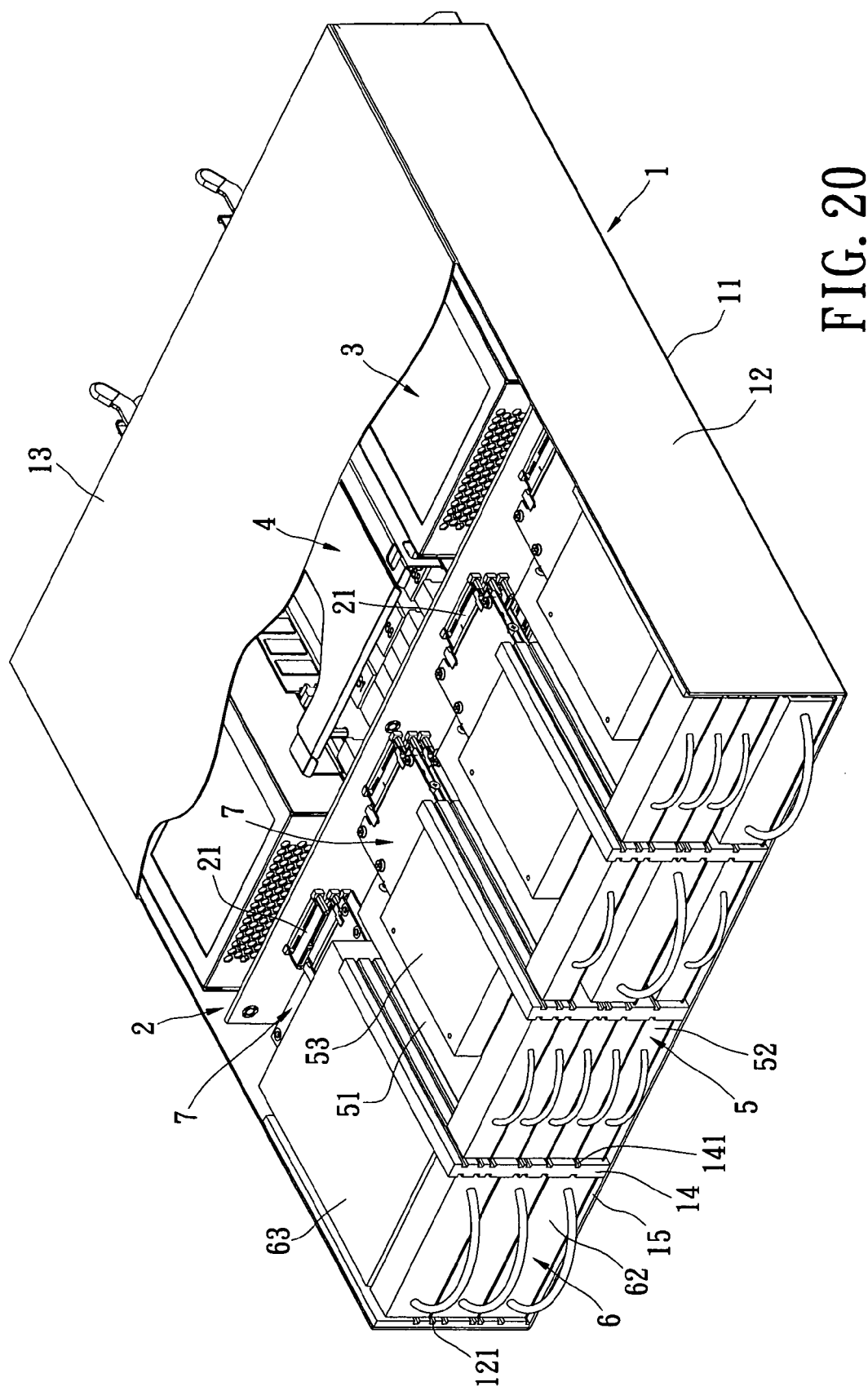
FIG. 20 is a perspective view of the storage system according to the fifth embodiment of the present invention.

As shown in FIGS. 20 and 21, there are four HDD receiving chambers 15 in the internal space of the casing 1. The left two HDD receiving chambers 15 are used to receive only the first type HDD devices 5 of the same dimension in one HDD receiving chamber and only the second type HDD devices 6 of the same dimension in the other HDD receiving chamber, respectively. For example, the leftmost HDD receiving chamber 15 receives only the second type HDD devices 6 of the same dimension, while the second HDD receiving chamber 15 from the left receives only the first type HDD devices 5 of the same dimension, as shown in FIG. 21. The right two HDD receiving chambers 15 are used to receive both the first type HDD device 5 and the second type HDD device 6, which have different dimensions. For example, the rightmost HDD receiving chamber 15 receives three first type HDD devices 5 at an upper part thereof and one second type HDD device 6 at the bottom part thereof, while the second HDD receiving chamber 15 from the right receives two first type HDD devices 5 at the top part and at the bottom part thereof, respectively, and one second type HDD device 6 at the middle part thereof, as shown in FIG. 21.

Figure 22:
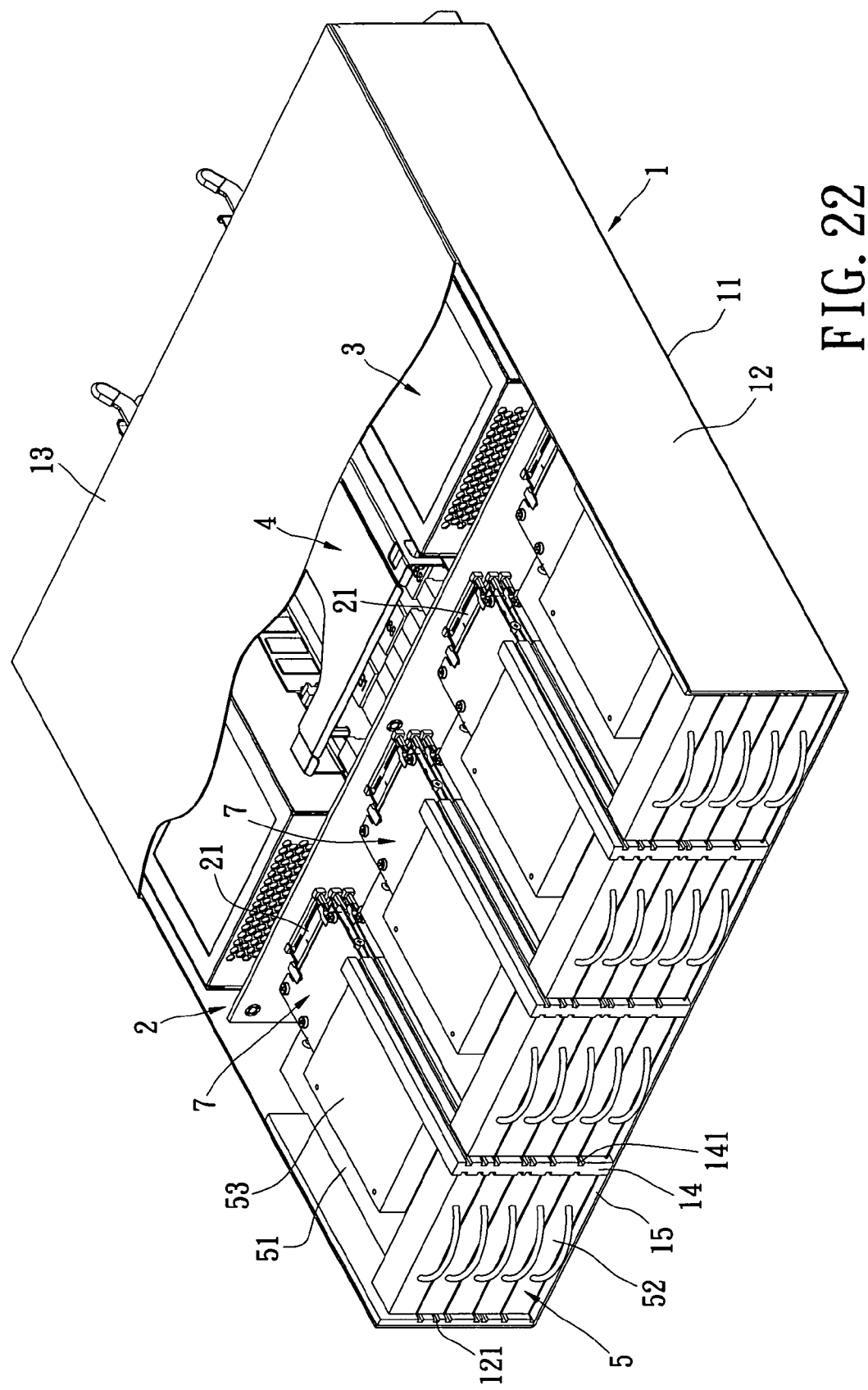
FIG. 22 is a perspective view showing another usage state of the storage system according to the fifth embodiment of the present invention.
Figure 23:
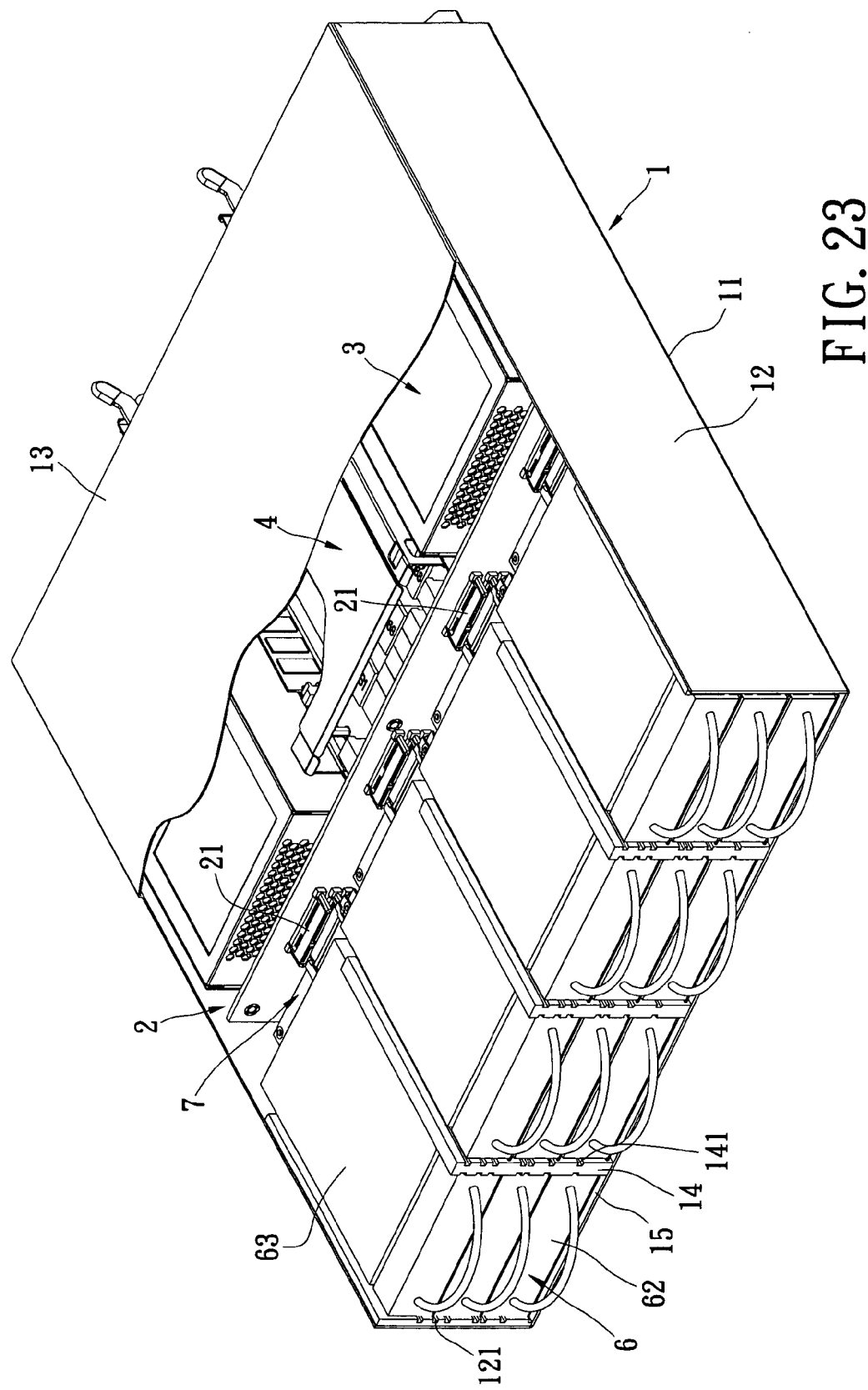
FIG. 23 is a perspective view showing yet another usage state of the storage system according to the fifth embodiment of the present invention.

Reference is made to FIG. 22. In this embodiment, there are four HDD receiving chambers 15 in the internal space of the casing 1. All the four HDD receiving chambers 15 are used to receive only the first type HDD devices 5 of the same dimension. As shown in FIG. 23, there are four HDD receiving chambers 15 in the internal space of the casing 1. All the four HDD receiving chambers 15 are used to receive only the second type HDD devices 6 of the same dimension. It should be noted that, in the above embodiment of FIGS. 16 to 23, each HDD receiving chamber 15 in a casing of a 2 U height can receive one of the following combinations of HDD devices: three second type HDD devices 6 or five first type HDD devices 5, or can receive one first type HDD device 5 and two second type HDD devices 6, or three second type HDD devices 6. Moreover, in this embodiment, any two second type HDD devices 6 consecutive received in an HDD receiving chamber can be replaced with three first type HDD devices 5.

Figure 24:
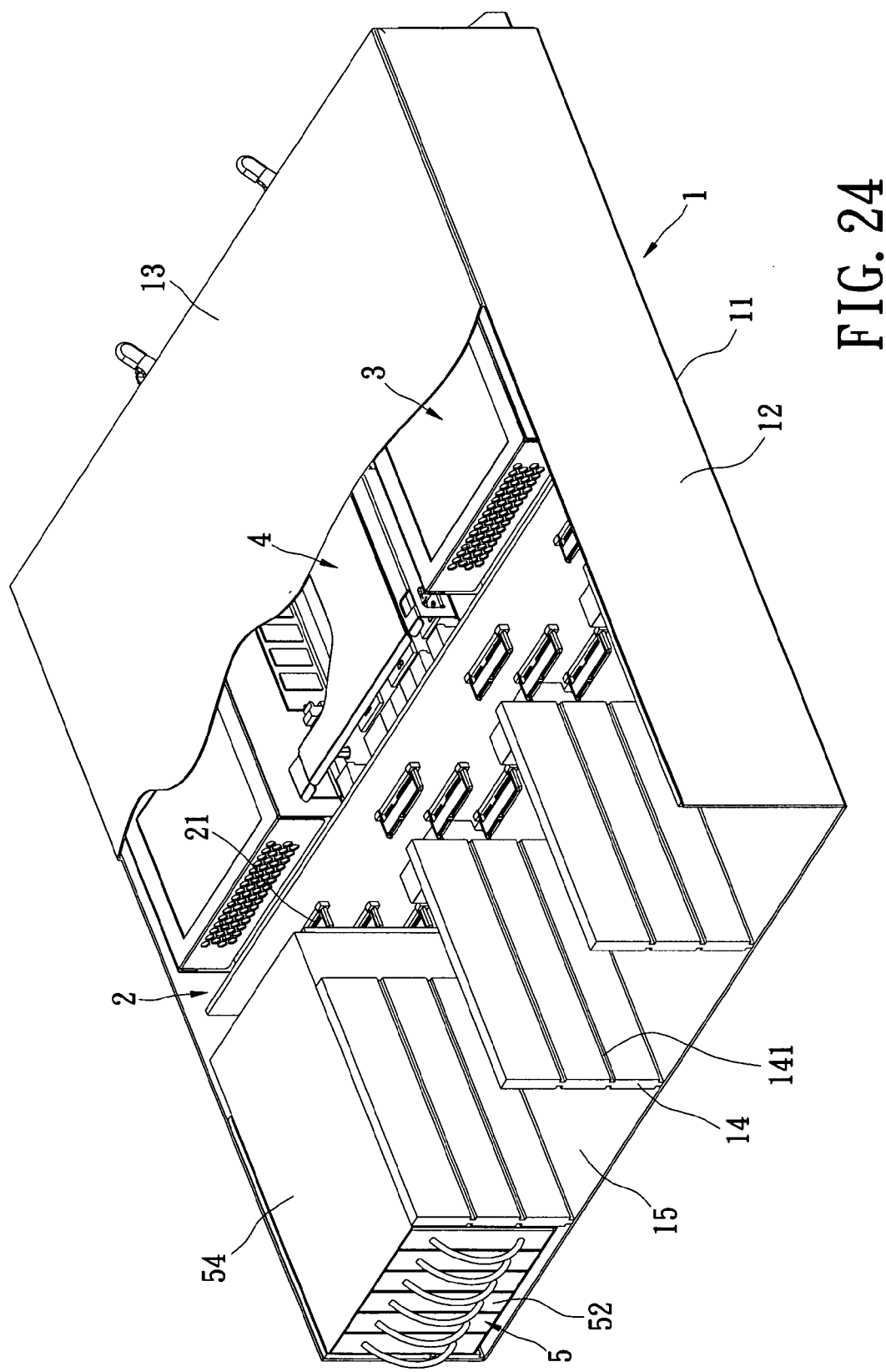
FIG. 24 is a perspective view of the storage system according to a sixth embodiment of the present invention with the first type HDD device received therein.
Figure 26:
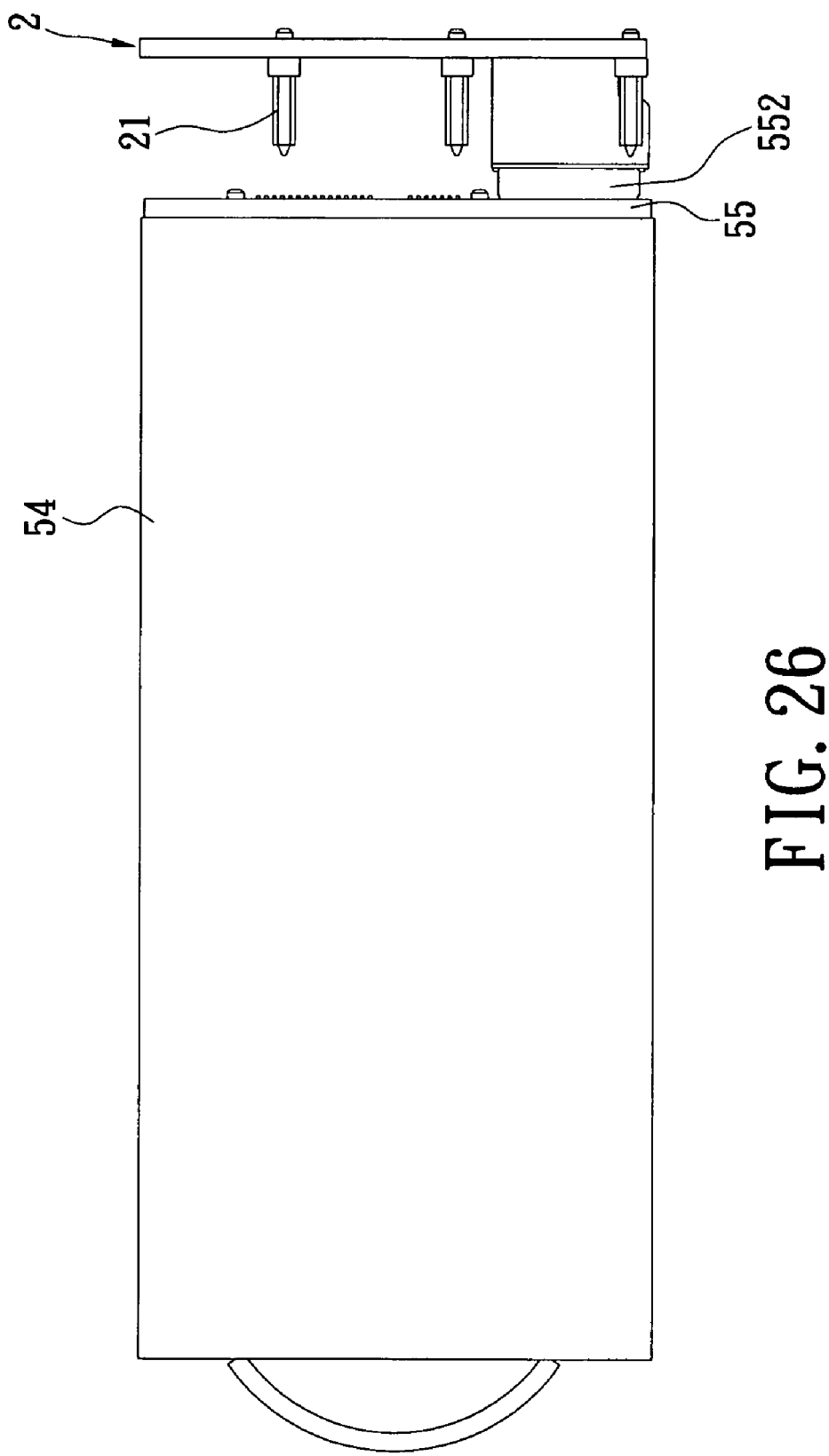
FIG. 26 is a side view of the first type HDD device and the backplane according to the sixth embodiment of the present invention.
Figure 27:
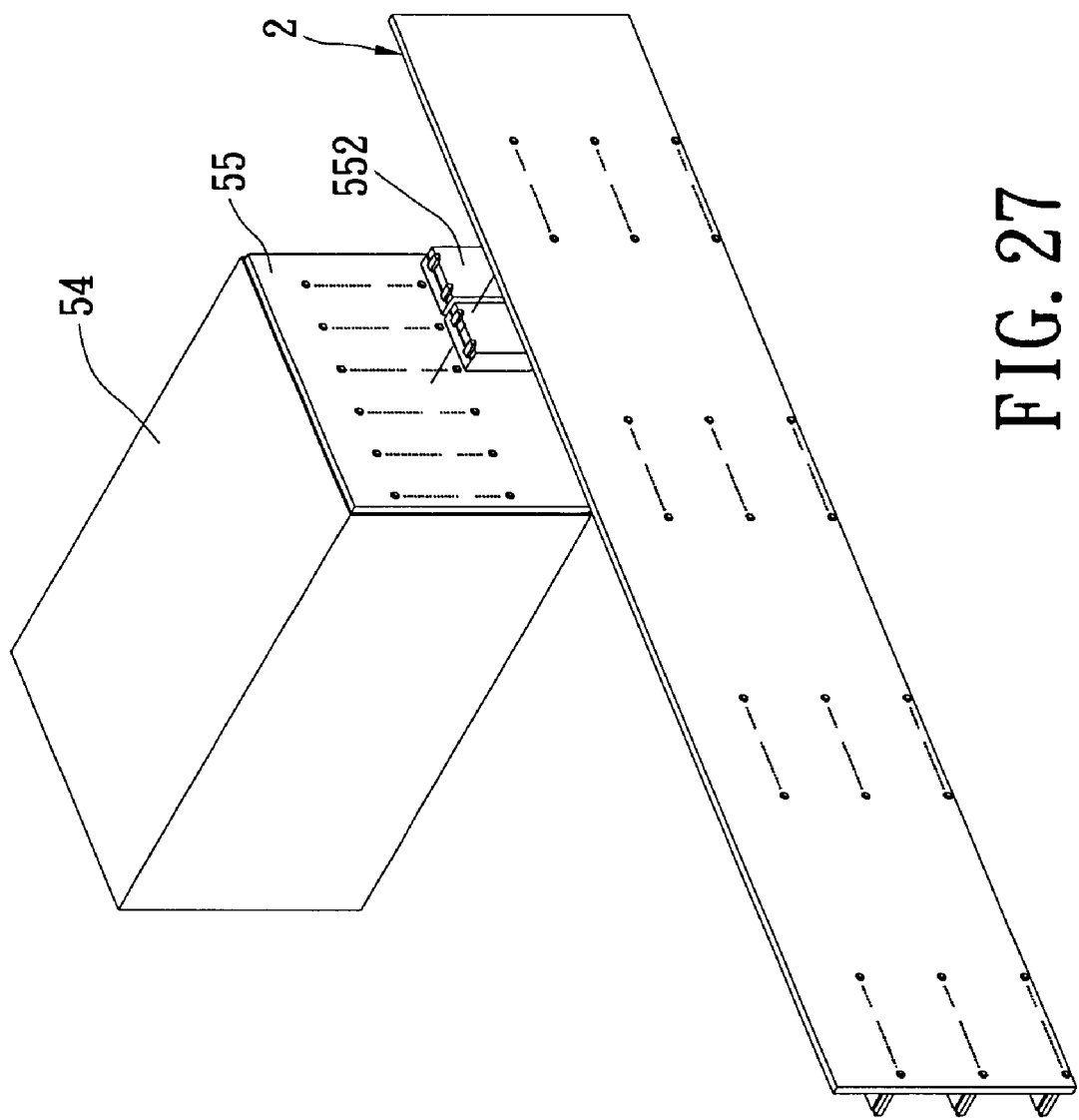
FIG. 27 is a perspective view of the first type HDD device and the backplane according to the sixth embodiment of the present invention.
Figure 28:
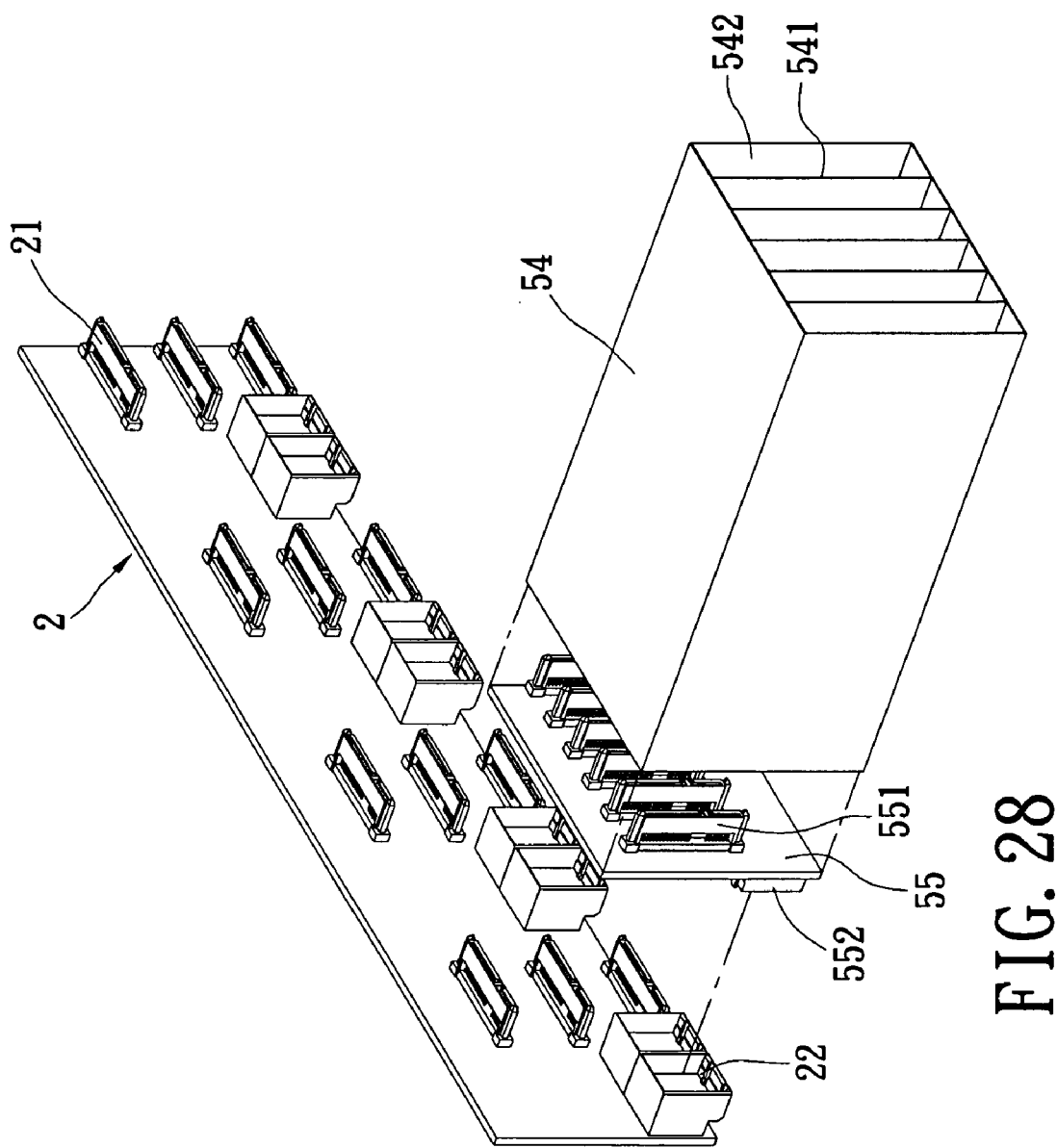
FIG. 28 is an exploded perspective view of the first type HDD device and the backplane according to the sixth embodiment of the present invention.

Part or all of the HDD devices 5 and 6 of the present invention can be vertically placed in the HDD receiving chambers 15. FIG. 24 is a perspective view of the storage system according to a sixth embodiment of the present invention with the first type HDD devices received therein. As shown in FIG. 24, the casing 1 is of 2 U height, and the first type HDD devices 5 are placed vertically in the HDD receiving chambers 15. The first type HDD devices 5 that are placed vertically are installed in a receiving box 54 (also referring to FIGS. 26 to 28). The receiving box 54 is mounted in the HDD receiving chamber 15 for receiving HDD devices 5. The receiving box 54 is divided by partitions 541 into a plurality of vertical accommodating rooms 542 for receiving the first type HDD devices 5. A second circuit board 55 is provided at the rear end of the receiving box 54. A plurality of vertical fourth connectors 551 is provided at the front side of the second circuit board 55. A connector (not shown) provided at the rear end of the first type HDD device 5 is mated with the fourth connector 551 to electrically connect the first type HDD device 5 to the second circuit board 55. At least one fifth connector 552 is provided at the rear side of the second circuit board 55. At least one sixth connector 22 is provided at the front side of the backplane 2. The fifth connector 552 and the sixth connector 22 are corresponding board-to-board connectors. The fifth connector 552 is mated with the sixth connector 22 to electrically connect the first type HDD device 5 and the second circuit board 55 to the backplane 2. The first type of HDD devices 5 is also electrically connected to the storage controller(s) 4 via the backplane 2. Although in this embodiment the receiving box 54 is divided by partitions 541 into a plurality of vertical accommodating rooms 542, it is also feasible for other supporting mechanisms and/or fixing mechanisms to be used to support and/or fix the first type of HDD device 5 in the receiving box 54 instead of providing partitions 541 in the receiving box 54. For example, mechanisms such as slide grooves and/or slide tracks (not shown) can be provided on the upper and lower side panels in the receiving box 54 to accomplish the supporting and/or fixing object. The slide grooves can resemble the slide grooves 121 or 141, and the slide tracks can resemble the slide tracks 122 or 142.

Figure 25:
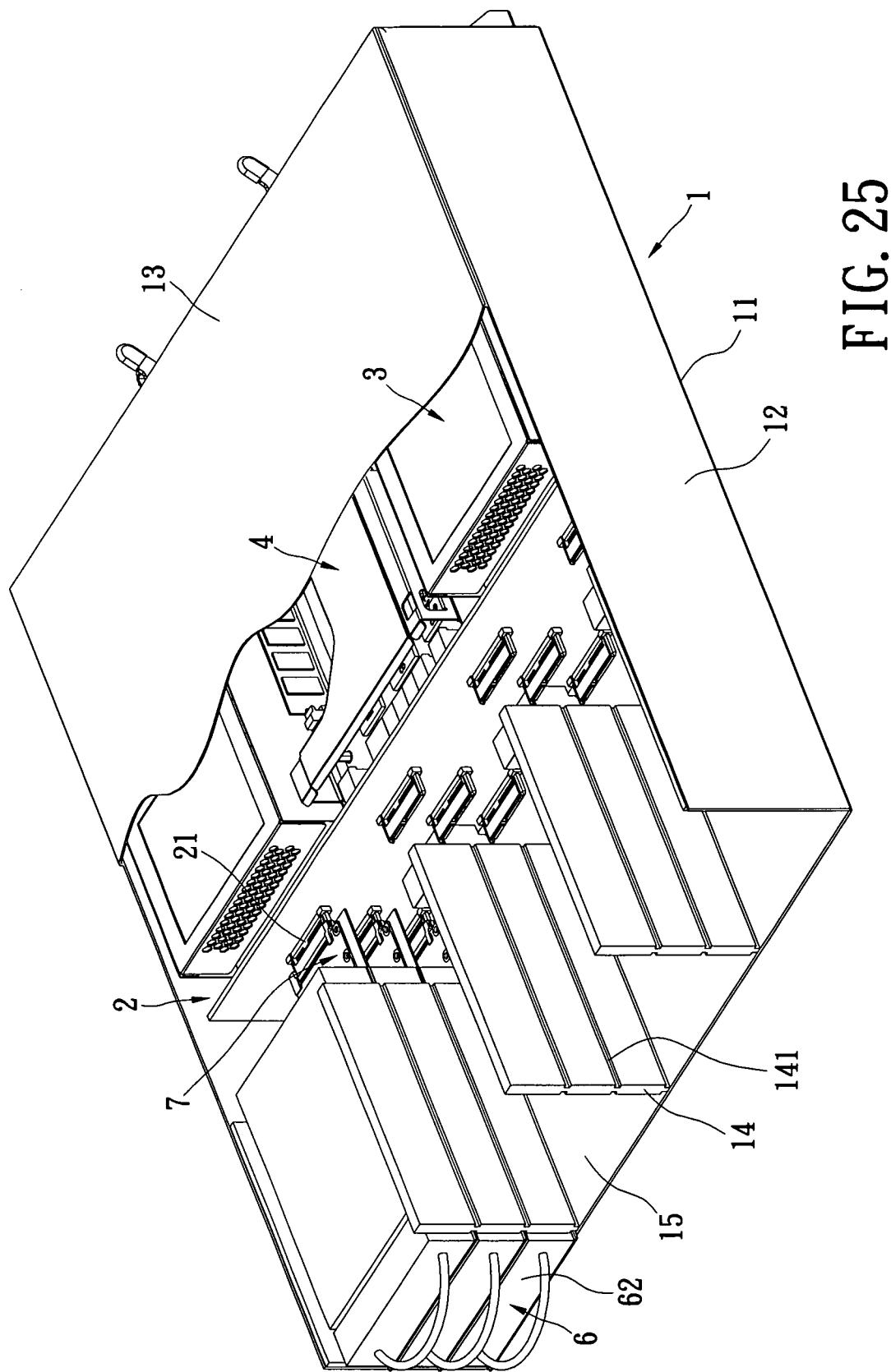
FIG. 25 is a perspective view of the storage system according to the sixth embodiment of the present invention with the second type HDD device received therein.
Figure 29:
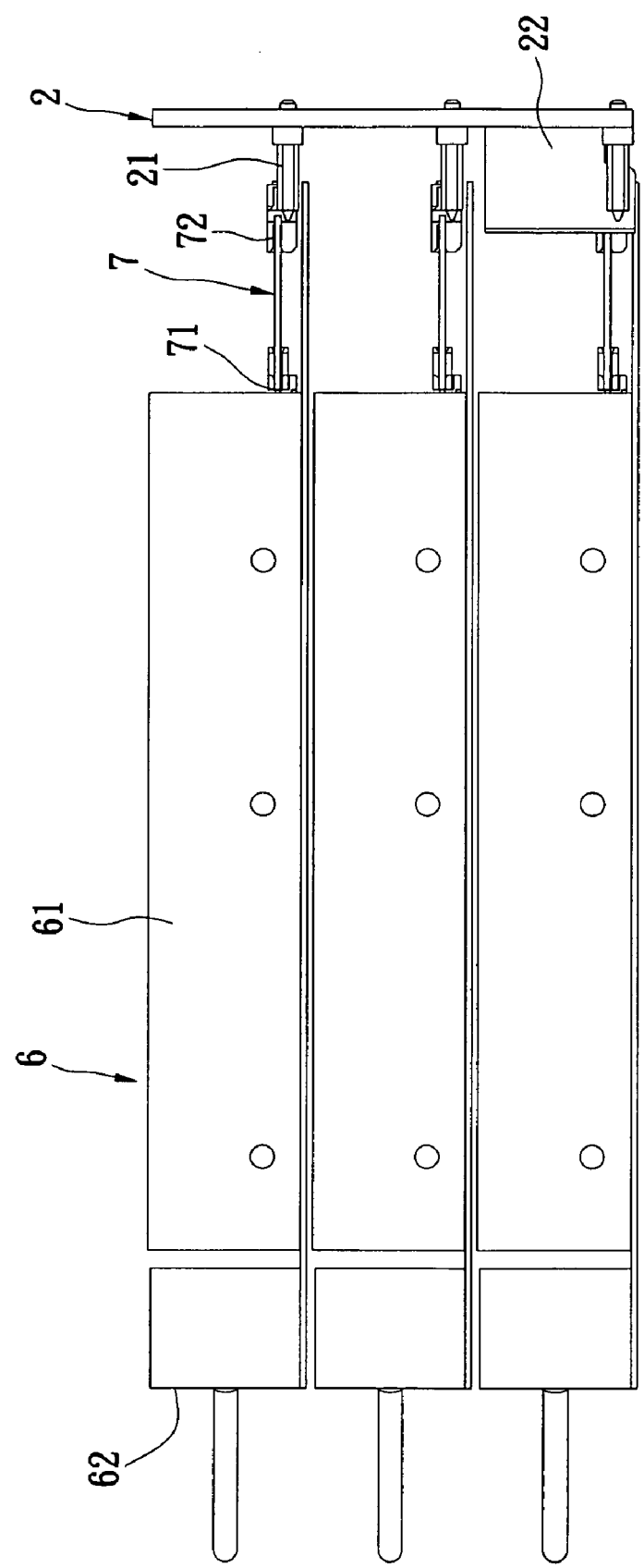
FIG. 29 is a side view of the second type HDD device and the backplane according to the sixth embodiment of the present invention.
Figure 30:
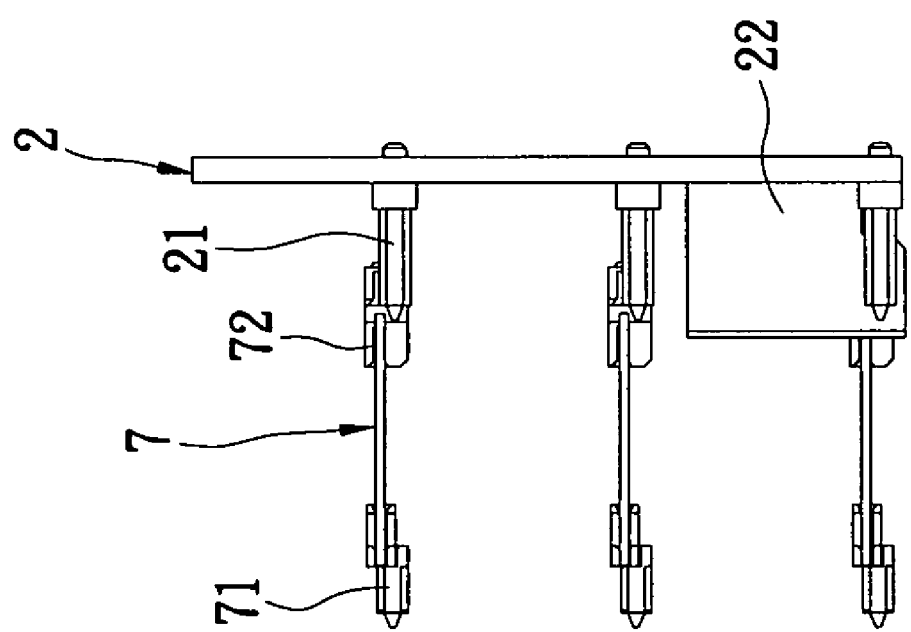
FIG. 30 is a side view of the backplane according to the sixth embodiment of the present invention.

Reference is made to FIG. 25. In this embodiment, the second type of HDD devices 6 are placed horizontally in the HDD receiving chamber 15. The second connectors 71 at the front ends of the adapter boards 7 are mated with connectors at the rear end of the second type HDD device 6 (also referring to FIGS. 29 and 30). The third connectors 72 at the rear ends of the adapter boards 7 are mated with the first connectors 21 of the backplane 2 so that the second type HDD device 6 can be electrically connected to the backplane 2 and the storage controller 4.

Figure 31:
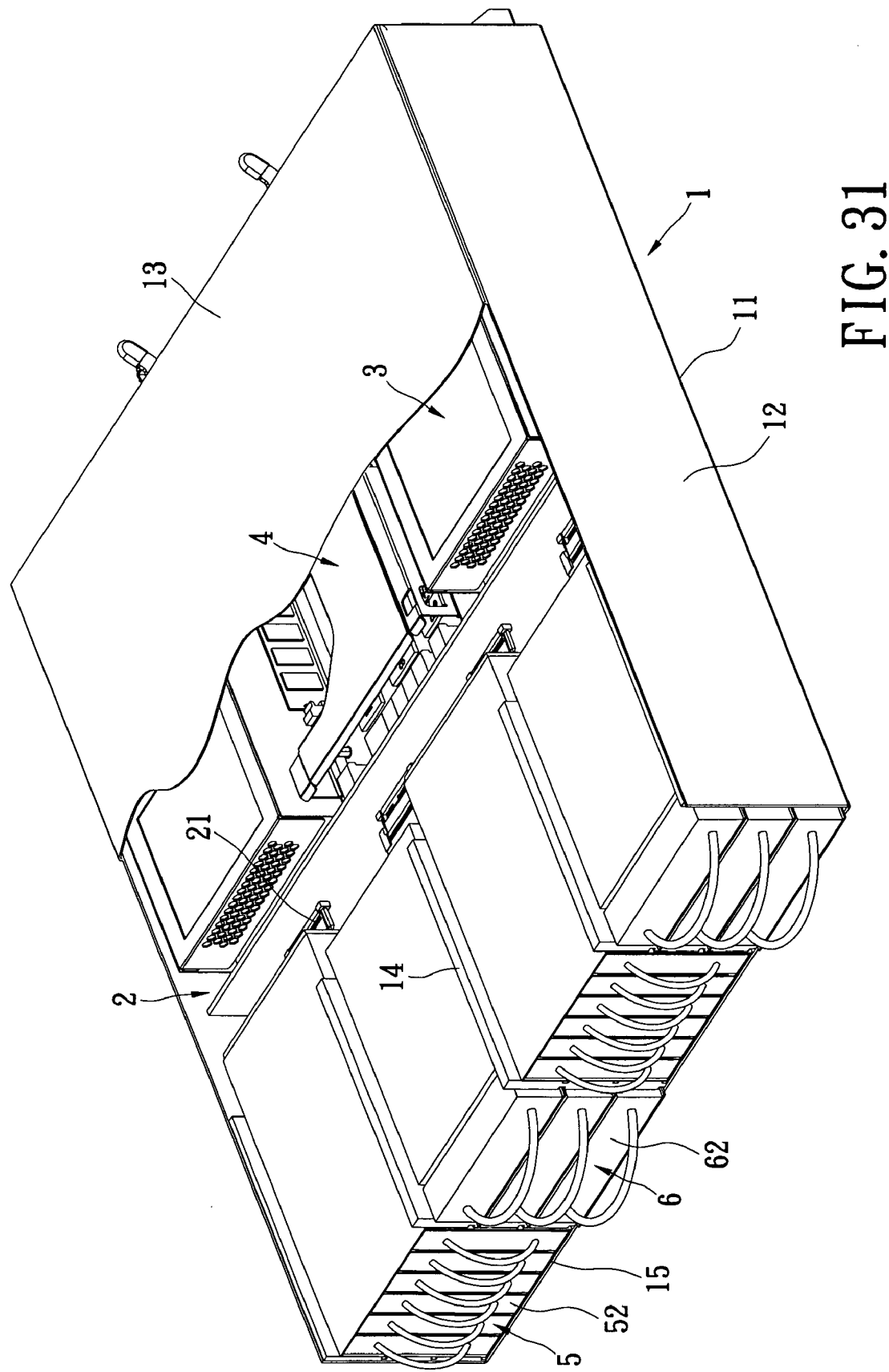
FIG. 31 is a perspective view of the storage system according to the sixth embodiment of the present invention.
Figure 32:
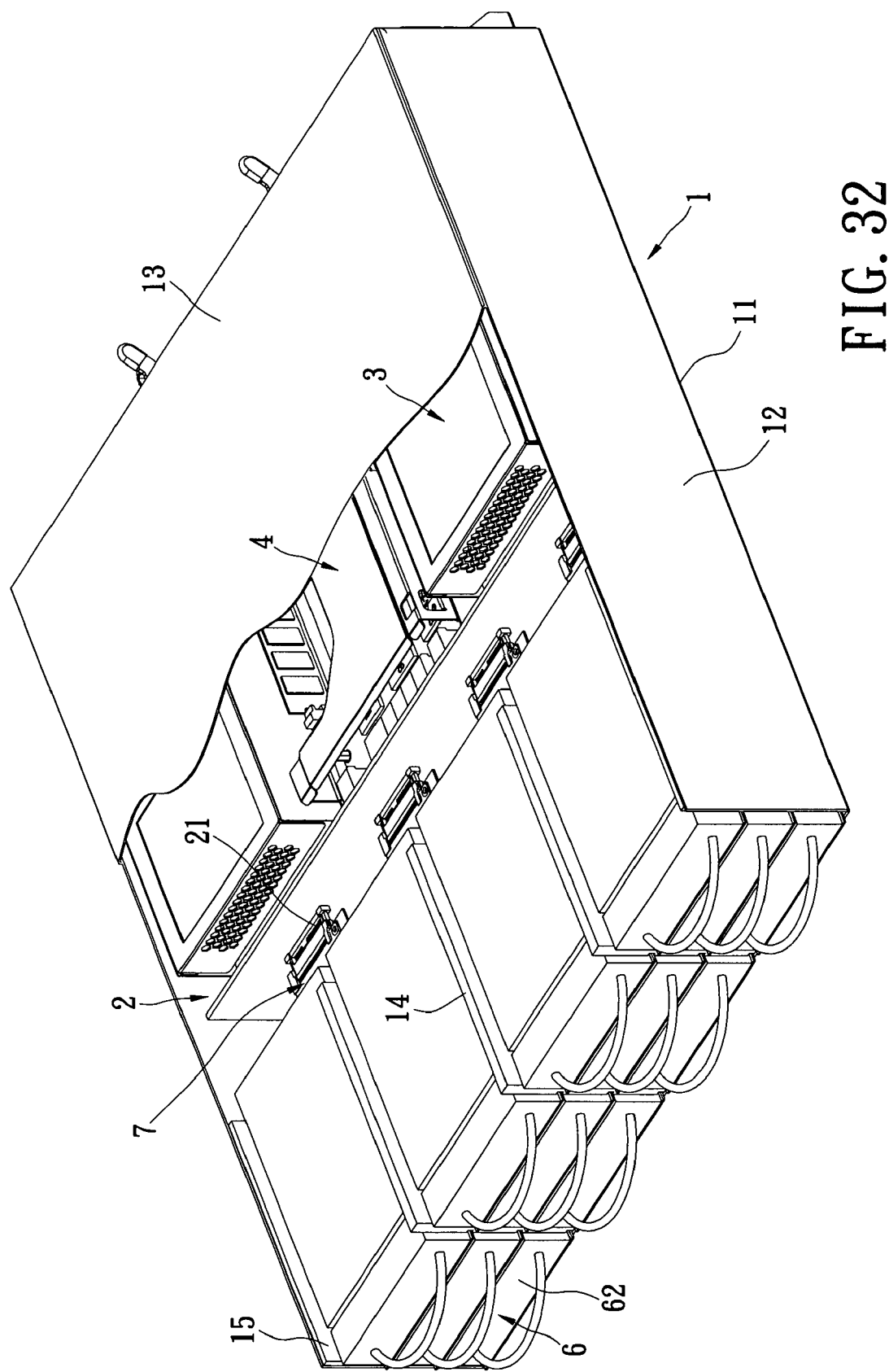
FIG. 32 is a perspective view showing another usage state of the storage system according to the sixth embodiment of the present invention.

In the embodiment shown in FIG. 31, there are four HDD receiving chambers 15 in the internal space of the casing 1. The first type HDD devices 5 are placed vertically in two of the HDD receiving chambers 15, and the second type HDD devices 6 are placed horizontally in the other two of the HDD receiving chambers 15. In the embodiment shown in FIG. 32, there are four HDD receiving chambers 15 in the internal space of the casing 1. All four HDD receiving chambers 15 are used to receive the second type of HDD devices 6 of the same dimension.

In the present invention, HDD receiving chambers 15 are provided in the internal space of the casing 1. The HDD receiving chambers 15 are adapted for selectively receiving the first type HDD device 5 and/or the second type HDD device 6 which are of different dimensions in order to gain higher flexibility in the selection of HDD dimensions The present invention can receive mixed HDDs of different dimensions to meet practical demands so as to facilitate the usage. Moreover, in the present invention, the structure is simple, the assembly is easy, and the cost is lower.

As can be known from the above embodiments, when the storage system of the present invention is used to receive HDDs of different dimensions, corresponding adapter boards 7 can be provided according to practical demands to facilitate electrical connection between the HDDs and the backplane 2. When the HDDs are directly connected to the backplane 2, however, no adapter boards 7 are required. Moreover, when identical or different HDDs are connected together, the provided adapter boards 7 can be the same or be different depending on practical demands.

Moreover, SAS HDDs and SATA HDDs have different market positionings. In general, SAS HDDs are of a better quality but have higher prices, while SATA HDDs have an inferior quality but lower prices. Therefore, SAS HDD storage systems and SATA HDD storage systems are aimed at different segments of the market. In the storage system of the present invention, because HDDs of different types can be received in the single system according to user's requirements, products of different market segmentations can be provided by manufacturers through an a single design, hence lowering warehouse and management costs. In addition, users can change the received HDDs (upgrading from SATA HDDs to SAS HDDs) according to different requirements after the purchase of the single system, hence enhancing flexibility of usage.

Furthermore, when two different type HDDs are both used in the same storage system, different data can be stored in different type HDDs according to the user's needs, thereby lowering costs and enhancing performance. For instance, important data (e.g., work data) can be stored in SAS HDDs of better quality, while secondary data (e.g., backup data) can be stored in SATA HDDs. In this way, important data can be safeguarded, and the storage cost of secondary data can be reduced. Also, when one 3.5" HDD is replaced with two 2.5" HDDs, the I/O transaction per second will increase due to the increase in the number of HDDs. The system performance can thus be enhanced in storage systems with the I/O transaction as their primary performance index. Therefore, users can adjust the allocation of type and number of HDDs in the system based on their requirements, which substantially enhances the flexibility of the system.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

It is claimed that:

1. A storage system adapted for receiving HDDs of different dimensions comprising:
 a casing having at least one HDD receiving chamber formed therein, wherein the HDD receiving chamber is used for selectively receiving first type HDD devices and/or second type HDD devices, the two types of HDD devices have HDDs of different dimensions therein, respectively;
 a backplane provided inside the casing and having a plurality of first connectors provided thereon for electrically connecting to the HDD devices;
 at least one power supply module provided inside the casing; and
 at least one storage controller provided inside the casing and being electrically connected to the backplane and the power supply module;
 wherein partitioning panels are provided inside the casing, and the partitioning panels divide an internal space of the casing into a plurality of HDD receiving chambers to respectively receive a plurality of HDD devices.

2. The storage system as claimed in claim 1 further comprising a fan module, wherein the fan module is provided inside the casing or in the power supply module.

3. The storage system as claimed in claim 1, wherein a plurality of HDD receiving chambers is formed inside the casing, and the first connectors are arranged in a plurality of rows respectively corresponding to the HDD receiving chambers.

4. The storage system as claimed in claim 1, wherein each of the first type HDD devices and the second type HDD devices has a carrier, and the HDDs are respectively received in the carriers.

5. The storage system as claimed in claim 4, wherein each of the carriers bears only one HDD.

6. The storage system as claimed in claim 4, wherein the HDD in the carrier is electrically separated from the backplane when the carrier is pulled out from the casing.

7. The storage system as claimed in claim 1, wherein the first type HDD devices are 2.5" HDDs, and the second type HDD devices are 3.5" HDDs.

8. The storage system as claimed in claim 7, wherein in one of the HDD receiving chambers, a 3.5" HDD device can be received in any two consecutive rooms for 2.5" HDD devices.

9. The storage system as claimed in claim 8, wherein the casing is a 3 U casing, and, in one of the HDD receiving chambers, eight 2.5" HDD devices can be consecutively received therein.

10. The storage system as claimed in claim 9, wherein the casing is a 3 U casing, and, in one of the HDD receiving chambers, four 3.5" HDD devices can be consecutively received therein.

11. The storage system as claimed in claim 1, wherein in one of the HDD receiving chambers, both the first type HDD device and the second type HDD device of different dimensions are received therein.

12. The storage system as claimed in claim 1, wherein in one of the HDD receiving chambers, all the HDD devices received therein are either the first type HDD devices of the same dimension or the second type HDD devices of the same dimension.

13. The storage system as claimed in claim 1, wherein a connector is disposed on a rear end of the first type HDD device and mated with one of the first connectors of the backplane.

14. The storage system as claimed in claim 1, wherein slide grooves and slide tracks are disposed on two side surfaces of the partitioning panels and internal surfaces of two sides of the casing, and the HDD devices are slidably connected to the slide grooves and the slide tracks.

15. The storage system as claimed in claim 1, wherein the HDD devices are placed horizontally in the HDD receiving chambers.

16. The storage system as claimed in claim 1, wherein part or all of the HDD devices are placed vertically in the HDD receiving chambers.

17. The storage system as claimed in claim 1, wherein the backplane is provided at a middle position inside the casing, the HDD devices are located in front of the backplane, and the power supply module and the storage controller are located behind the backplane.

18. The storage system as claimed in claim 1, wherein the casing is a 2 U casing.

19. The storage system as claimed in claim 18, wherein in one of the HDD receiving chambers, five 2.5" HDD devices, or three 2.5" HDD devices and one 3.5" HDD device, or one 2.5" HDD device and two 3.5" HDD devices can be simultaneously received.

20. The storage system as claimed in claim 18, wherein in one of the HDD receiving chambers, five 2.5" HDD devices, or three 2.5" HDD devices and one 3.5" HDD device, or one 2.5" HDD device and two 3.5" HDD devices, or three 3.5" HDD devices can be simultaneously received.

21. The storage system as claimed in claim 18, wherein in one of the HDD receiving chambers, six 2.5" HDD devices or three 3.5" HDD devices can be simultaneously received.

22. The storage system as claimed in claim 1, wherein the first type HDD device and the second type HDD device have different lengths, widths and heights.

23. The storage system as claimed in claim 1, wherein in one of the HDD receiving chambers, a plurality of the first connectors on the backplane are of a same orientation and aligned with each other in a row.

24. The storage system as claimed in claim 23, wherein the casing is a 2 U casing, and in one of the HDD receiving chambers, the backplane has seven identical first connectors.

25. The storage system as claimed in claim 24, wherein in one of the HDD receiving chambers, the first, third, fourth and sixth ones of the first connectors in the row are provided for connecting to 2.5" HDD devices, the second and fifth ones of the first connectors in the row are provided for connecting to 3.5" HDD devices, and the seventh one of the first connectors in the row is provided for connecting to a 2.5" or 3.5" HDD device.

26. The storage system as claimed in claim 24, wherein in one of the HDD receiving chambers, when the first connectors are used to connect 2.5" HDD devices, in any two consecutive rooms for the 3.5" HDD devices, three 2.5" HDD devices can be consecutively received therein.

27. The storage system as claimed in claim 1, wherein the first type HDD is a 2.5" SAS HDD, and the second type HDD is a 3.5" SATA HDD or a 3.5" SAS HDD.

28. A storage system adapted for receiving HDDs of different dimensions comprising:
a casing having at least one HDD receiving chamber formed therein, wherein the HDD receiving chamber is used for selectively receiving first type HDD devices and/or second type HDD devices, the two types of HDD devices have HDDs of different dimensions therein, respectively;
a backplane provided inside the casing and having a plurality of first connectors provided thereon for electrically connecting to the HDD devices;
at least one power supply module provided inside the casing; and
at least one storage controller provided inside the casing and being electrically connected to the backplane and the power supply module;
wherein the second type HDD device includes a second type HDD adapter board, and, a second connector is disposed on a front end of the second type HDD adapter board to mate with a connector at a rear end of the second type HDD device and a third connector is disposed on a rear end of the second type HDD adapter board to mate with one of the first connectors of the backplane.

29. The storage system as claimed in claim 28, wherein the first type HDD device includes a first type HDD adapter board, and a seventh type connector is disposed on a front end of the first type HDD adapter board to mate with a connector at a rear end of the first type HDD device, and a third connector is disposed on a rear end of the first type HDD adapter board to mate with one of the first connectors of the backplane.

30. A storage system adapted for receiving HDDs of different dimensions comprising:
a casing having at least one HDD receiving chamber formed therein, wherein the HDD receiving chamber is used for selectively receiving first type HDD devices and/or second type HDD devices, the two types of HDD devices have HDDs of different dimensions therein, respectively.
a backplane provided inside the casing and having a plurality of first connectors provided thereon for electrically connecting to the HDD devices;
at least one power supply module provided inside the casing; and
at least one storage controller provided inside the casing and being electrically connected to the backplane and the power supply module;
a fan module, wherein the fan module is provided in the casing or in the power supply module;
a plurality of HDD receiving chambers are formed inside the casing, the first connectors are arranged in a plurality of lines respectively corresponding to the plurality of HDD receiving chambers;
wherein each of the first type HDD devices and the second type HDD devices has a carrier, and the HDDs are respectively received in the carriers;
wherein the first type HDD device is a 2.5" HDD, the second type HDD device is a 3.5" HDD; the 2.5" HDD is an SAS HDD, the 3.5" HDD is an SAS or an SATA HDD;
in one of the HDD receiving chambers, both the first type HDD device and the second type HDD device of different dimensions are received;
wherein the second type HDD device includes a second type HDD adapter board, and a second connector is disposed on a front end of the second type HDD adapter board to mate with a connector at a rear end of the second type HDD device, and a third connector is disposed on a rear end of the second type HDD adapter board to mate with one of the first connectors of the backplane; and
a connector is disposed on a rear end of the first type HDD device and is also mated with one of the plurality of first connectors of the backplane;
wherein the backplane is provided at a middle position inside the casing, the HDD devices are located in front of the backplane, and the power supply module and the storage controller are located behind the backplane;
wherein the first type HDD device and the second type HDD device have different lengths, widths and heights; and
wherein each of the carriers bear only an HDD, and the HDD in the carrier is electrically separated from the backplane when the carrier is pulled out from the casing.

31. A storage system adapted for receiving HDDs of different dimensions comprising:
a casing having at least one HDD receiving chamber formed therein, wherein the HDD receiving chamber is used for selectively receiving first type HDD devices and/or second type HDD devices, the two types of HDD devices have HDDs of different dimensions therein, respectively;
a backplane provided inside the casing and having a plurality of first connectors provided thereon for electrically connecting to the HDD devices;
at least one power supply module provided inside the casing; and
at least one storage controller provided inside the casing and being electrically connected to the backplane and the power supply module;
wherein a part of the HDD receiving chamber is exclusively used to receive the second type HDD device, and other part of the HDD receiving chamber is used to receive either the first type or the second type HDD device.

32. A storage system adapted for receiving HDDs of different dimensions comprising:
a casing having at least one HDD receiving chamber formed therein, wherein the HDD receiving chamber is used for selectively receiving first type HDD devices and/or second type HDD devices, the two types of HDD devices have HDDs of different dimensions therein, respectively;

a backplane provided inside the casing and having a plurality of first connectors provided thereon for electrically connecting to the HDD devices;

at least one power supply module provided inside the casing; and at least one storage controller provided inside the casing and being electrically connected to the backplane and the power supply module;

wherein a part of the HDD receiving chamber is exclusively used to receive the first type HDD device, and other part of the HDD receiving chamber is used to receive either the first type or the second type HDD device.

33. A storage system adapted for receiving HDDs of different dimensions comprising:

a casing having at least one HDD receiving chamber formed therein, wherein the HDD receiving chamber is used for selectively receiving first type HDD devices and/or second type HDD devices, the two types of HDD devices have HDDs of different dimensions therein, respectively;

a backplane provided inside the casing and having a plurality of first connectors provided thereon for electrically connecting to the HDD devices;

at least one power supply module provided inside the casing; and at least one storage controller provided inside the casing and being electrically connected to the backplane and the power supply module;

wherein a first part of the HDD receiving chamber is exclusively used to receive the first type HDD device, a second part of the HDD receiving chamber is exclusively used to receive the second type HDD device, and other part of the HDD receiving chamber is used to receive either the first type or the second type HDD device.

* * * * *